US 6,633,538 B1

(12) United States Patent
Tanaka et al.

(10) Patent No.: US 6,633,538 B1
(45) Date of Patent: Oct. 14, 2003

(54) NODE REPRESENTATION SYSTEM, NODE MONITOR SYSTEM, THE METHODS AND STORAGE MEDIUM

(75) Inventors: Ryoju Tanaka, Tokyo (JP); Yasuo Tamura, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/226,239

(22) Filed: Jan. 7, 1999

(30) Foreign Application Priority Data

Jan. 30, 1998 (JP) .......................................... 10-019223

(51) Int. Cl.$^7$ ............................................ H04L 12/437
(52) U.S. Cl. ....................................... 370/222; 709/208
(58) Field of Search ................................. 709/208, 209, 709/211, 346, 700, 710, 712; 370/216, 218, 220, 221, 222, 223, 258, 449, 452; 714/1, 2, 5, 7, 13; 700/3; 710/110; 340/2.24, 3.1, 3.42, 3.44; 712/28

(56) References Cited

U.S. PATENT DOCUMENTS

| | | | | | |
|---|---|---|---|---|---|
| 4,654,654 A | * | 3/1987 | Butler et al. | ............. | 340/825.5 |
| 4,914,657 A | * | 4/1990 | Walter et al. | ................ | 709/248 |
| 5,220,562 A | * | 6/1993 | Takada et al. | ............. | 370/404 |
| 5,416,777 A | * | 5/1995 | Kirkham | ................ | 340/310.06 |
| 5,461,608 A | * | 10/1995 | Yoshiyama | ................ | 340/3.44 |
| 5,473,599 A | * | 12/1995 | Li et al. | ..................... | 370/219 |
| 5,508,997 A | * | 4/1996 | Katou | ........................ | 370/228 |
| 5,583,754 A | * | 12/1996 | Leonhardt et al. | ............. | 700/3 |
| 5,751,220 A | * | 5/1998 | Ghaffari | ..................... | 340/10.2 |
| 5,832,195 A | * | 11/1998 | Braun et al. | .................... | 714/2 |
| 5,835,696 A | * | 11/1998 | Hess | ........................... | 714/10 |
| 5,884,072 A | * | 3/1999 | Rasmussen | .................. | 709/223 |
| 5,914,666 A | * | 6/1999 | Zingsheim et al. | .......... | 340/3.5 |
| 5,920,267 A | * | 7/1999 | Tattersall et al. | ....... | 340/825.52 |
| 6,061,600 A | * | 5/2000 | Ying | .............................. | 700/3 |
| 6,108,300 A | * | 8/2000 | Coile et al. | .................. | 370/217 |
| 6,243,762 B1 | * | 6/2001 | Greene et al. | ............. | 709/106 |
| 6,317,415 B1 | * | 11/2001 | Darnell et al. | ............. | 370/230 |
| 6,324,161 B1 | * | 11/2001 | Kirch | ........................ | 370/217 |

\* cited by examiner

Primary Examiner—Melvin Marcelo
Assistant Examiner—Derrick W Ferris
(74) Attorney, Agent, or Firm—Staas & Halsey LLP

(57) ABSTRACT

A node representation system designates for one of a plurality of nodes for a master node and the rest for slave nodes. Each node refers to an address management table, and monitors the node of an entry next to each node in the table in order. As a result, each node monitors the node of the next entry, and simultaneously is monitored by the node of the preceding entry. When detecting a failure in a node to be monitored, a node represents the functions of the failed node, and further represents the monitoring of a node monitored by the node. When an instruction to duplicate the resource of the master node to each slave node is issued by a control node, the master node represents the functions of each slave node while duplicating.

81 Claims, 14 Drawing Sheets

ADDRESS MANAGEMENT TABLE 112A

| ADDRESS NAME | IP ADDRESS |
|---|---|
| MASTER VIRTUAL IP ADDRESS | 172. 16. 0. 1 |
| NODE 1 REAL IP ADDRESS | 172. 16. 1. 1 |
| NODE 1 VIRTUAL IP ADDRESS | 172. 16. 2. 1 |
| NODE 2 REAL IP ADDRESS | 172. 16. 1. 2 |
| NODE 2 VIRTUAL IP ADDRESS | 172. 16. 2. 2 |
| NODE 3 REAL IP ADDRESS | ⋮ |
| NODE 3 VIRTUAL IP ADDRESS | ⋮ |
| ⋮ | ⋮ |

FIG. 2

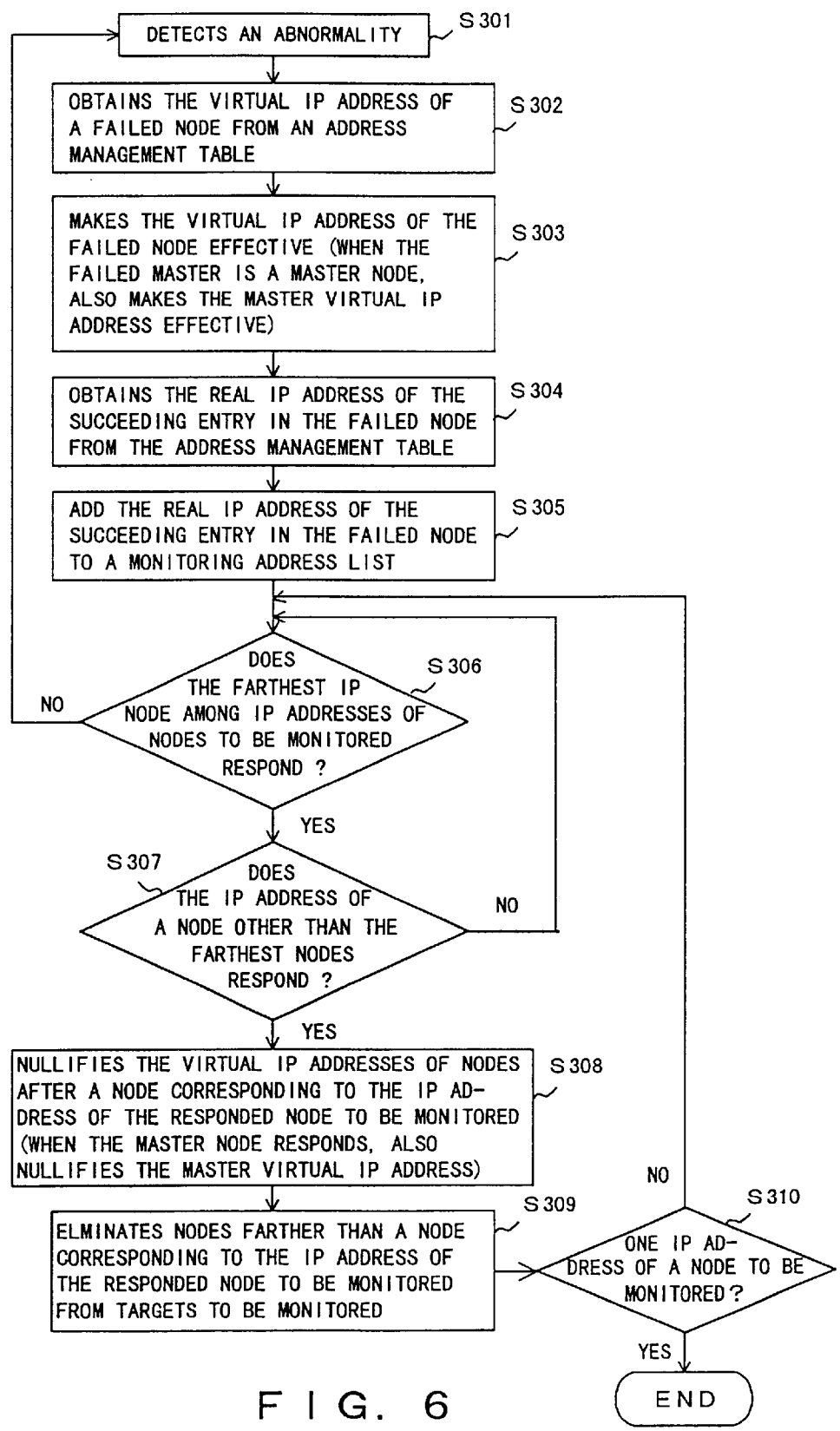
F I G. 6

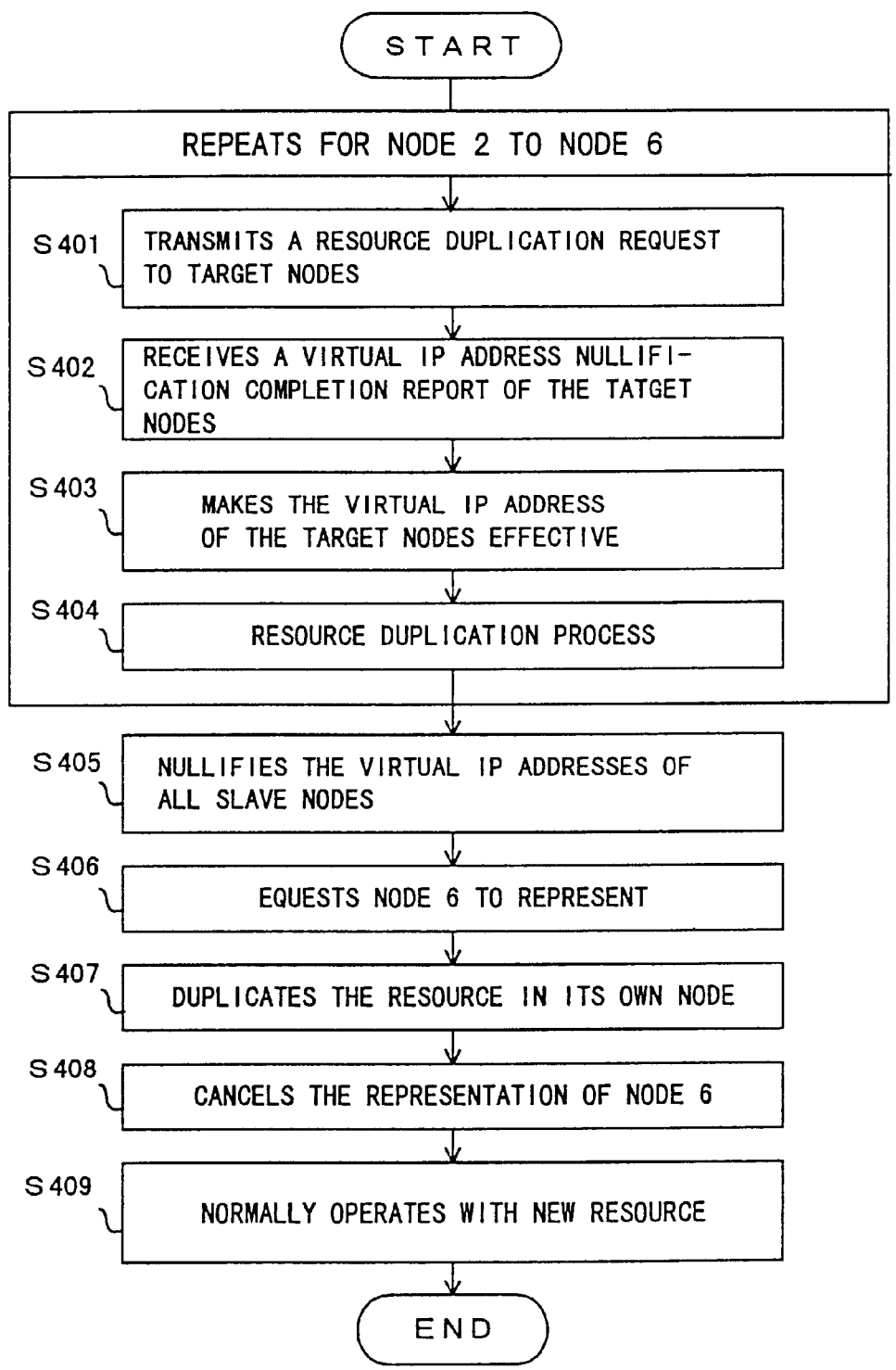
F I G. 7

FIG. 10

112C SCHEDULE TABLE

| NODE | SCHEDULE DATA 1 | | | | SCHEDULE DATA 2 | | | | ... | SCHEDULE DATA n | | | |
|---|---|---|---|---|---|---|---|---|---|---|---|---|---|
| | JOB CODE | DATE | START TIME | END TIME | JOB CODE | DATE | START TIME | END TIME | | JOB CODE | DATE | START TIME | END TIME |
| M | DUPLICATION OF RESOURCE | 1997.12.31 | 22:00:00 | | UPDATE OF RESOURCE | 1998.01.01 | 0:00:00 | - | | | | | |
| S1 | | | | | | | | | | | | | |
| S2 | S3 REPRESENTED | 1997.12.30 | 8:00:00 | 17:00:00 | | | | | | | | | |
| S3 | PAUSE OF OPERATION | 1997.12.30 | 8:00:00 | 17:00:00 | | | | | | | | | |
| S4 | | | | | | | | | | | | | |
| S5 | | | | | | | | | | | | | |
| . | | | | | | | | | | | | | |
| . | | | | | | | | | | | | | |
| . | | | | | | | | | | | | | |
| Sn | | | | | | | | | | | | | |

/ 300

| | |
|---|---|
| MASTER IDENTIFICATION ☐ ⟵ 310 | |
| REAL IP ADDRESS | XXX.XXX.XXX.XXX ⟵ 320 |
| VIRTUAL IP ADDRESS | XXX.XXX.XXX.XXX ⟵ 330 |
| MONITORING IP ADDRESS | XXX.XXX.XXX.XXX ⟵ 340 |
| MONITORING SERVICE | ☐ WWW ☐ DNS ☐ Mail ⟵ 350 |
| VIRTUAL OPERATION | ◉ YES ○ NO ⟵ 360 |
| REPRESENTATION | ◉ YES ○ NO ⟵ 370 |

FIG. 11

DURING OPERATION ( COLOR BLUE ) +
DURING REPRESENTATION ( BLINKING BLUE ) /
DURING STOP ( COLOR RED ) −

NODE REPRESENTATION SYSTEM, NODE MONITOR SYSTEM, THE METHODS AND STORAGE MEDIUM

BACKGROUND OF THE INVENTION

1. Field of the Invention

The present invention relates to a system for representing the functions of a node stopped due to a failure, etc. in a network where a plurality of nodes are connected, and more particularly to a system for automatically representing the functions of a node whose stopping is detected by network monitoring or a node stopped by instructions.

2. Description of the Related Art

Lately, along with the rapid spread of computers, a lot of processes have been executed by computers. Such computerization not only efficiently processes a lot of data, but also makes possible the quick transmission of a lot of information to a variety of places across the world through a network. As a result, computers connected to the Internet, a wide area network (WAN) or a local area network (LAN), etc. have become indispensable in a lot of activities including business activities.

As the importance of a network and computer nodes connected to the network increases, a system for early detection of the failure of nodes providing a variety of functions on a network and promptly taking appropriate measures has been highly demanded.

In a conventional monitor apparatus for monitoring, nodes to be monitored are fixed. The monitor apparatus transmits a specific signal to one or more nodes to be monitored at predetermined intervals, and by confirming that the nodes respond to the signal and return an answer signal to the apparatus, verifies that the nodes operate normally. This signal transmitted from the monitor apparatus is generally called a heart beat signal or a health signal, and such node verification is usually called a health check or an alive check. The health check or alive check is performed not only by the above simple method but also at a variety of levels, such as an application level, etc., as occasion demands. It can also be verified whether or not a specific function provided by such a node operates normally.

The monitor apparatus is often installed as an apparatus (node) dedicated to monitoring, and when a failure occurs in the node itself, the node ceases to be a monitor apparatus and as a matter of fact, cannot report the stopping of the monitor apparatus to another node, etc.

In a computer system with improved failure-proof properties, nodes to be monitored are often provided in advance with a standby (back-up) node, and generally speaking, in a dual system a hardware dualizing method such that when a failure occurs in a node to be monitored, the node is completely switched over to the standby node, is adopted. Since most of the standby nodes have no other functions but to monitor the nodes when a node to be monitored operates normally, that is, while a running node to be monitored is operating normally, from the characteristic viewpoint of the standby set, the resource and capability of the standby nodes are not sufficiently utilized.

Conventionally the setting of the control procedures of nodes and definition between nodes is also too complicated to unifiedly control the status of a plurality of nodes existing on a network and to operate the nodes, and requires an expensive dedicated system.

Furthermore, when a node functions as a resource server for providing a certain resource, for example, to many and unspecified users through a network, and the contents of the resource are updated, the services provided by the node have to be temporarily stopped.

As described earlier, in a conventional monitor apparatus a monitoring node itself cannot be monitored, and when a failure occurs in the node, this fact cannot be reported to another node.

Furthermore, in order to dualize a node to be monitored it is necessary to provide a dedicated standby (back-up) node to the node, and the resource and capability of the standby node cannot be efficiently utilized while the running node is normally operating.

The setting of the control procedures of nodes and definition between nodes is also too complicated to unifiedly control the status of a plurality of nodes existing on a network and to operate the nodes, and requires an expensive dedicated system.

Furthermore, when the resource contents of a node functioning as a resource server is updated, the services provided by the node have to be temporarily stopped.

SUMMARY OF THE INVENTION

It is an object of the present invention to provide a system such that out of a plurality of nodes on a network, one may be set as a master node and one or more as slave nodes, responding to the detection of a failure in a node, the occurrence of a schedule or the occurrence of a variety of events due to a plurality of resource duplication requests, etc., another node can provide functions provided by a node stopped by the event in place of the node, and nodes monitored by the node stopped by the event can be monitored by another node.

It is another object of the present invention to provide an inexpensive system for unifiedly controlling the status of a plurality of nodes using a control node, and operating the nodes.

As the first aspect the present invention presumes a node representation system such that each node can represent functions provided by another node in a system where a plurality of nodes are connected through a network.

The first aspect of the present invention comprises a activation control unit for obtaining information on monitoring when each node is activated, and a monitoring/representing unit for monitoring the operation of a first other node based on information obtained by the activation control unit, monitoring a second other node monitoring the first other node, and representing the monitoring of a second other node monitored by the first other node and functions by provided by the first other node when a failure is detected in the operation of the first other node. Both the activation control unit and monitoring/representing unit of each node control in such a way that a first node may monitor the operation of a second node, the second node may monitor the operation of the first node or a third node, and after that such a monitoring relation is established in order, and one closed-looped logical monitoring network can be constructed.

By adopting such a configuration, nodes can be effectively monitored by making the other nodes. Since, even if a failure occurs in a certain node, the functions of the node are dynamically represented by a node monitoring the node, the system resource can be efficiently utilized and the security of the whole system can be improved as well.

As the second aspect the present invention presumes a node representation system such that each node can represent functions provided by another node in a system where a plurality of nodes are connected through a network.

In the second aspect, out of a plurality of nodes on a network, one may be set as a master node and one or more as slave nodes.

Each of the master node and the slave nodes comprises an activation control unit for obtaining information on monitoring, and a first monitoring/representing unit for monitoring the operation of a first node based on information obtained by the activation control unit, and representing the monitoring of a second node monitored by the first node and functions by provided by the first node when a failure is detected in the operation of the first node. Both the activation control unit and the monitoring/representing unit of each node (both the master node and slave nodes) control in such a way that a first node may monitor the operation of a second node, the second node may monitor the operation of the first node or a third node, and after that such a monitoring relation is established in order, and one closed-looped logical monitoring network can be constructed.

Furthermore, the master node and the slave nodes comprises resource duplication process unit for duplicating a resource from the master node to the slave nodes and enabling the monitoring/representing unit of the master node to represent and perform functions provided by the slave nodes during the resource duplication.

Adopting such a configuration, even when the resource of a certain node is updated, it is unnecessary to stop the node, and services provided by the node can be kept provided to a user without interruption even while the resource of the node is being updated.

As the third aspect, the present invention presumes a node monitor system such that each node can monitor the failures of another node in a system where a plurality of nodes are connected through a network.

In the third aspect, each of the nodes comprises an activation control unit for obtaining information on monitoring when the node is activated and a monitor unit for monitoring the operation of a first other node based on information obtained by the activation control unit, representing the monitoring of a second other node monitored by the first node when a failure is detected in the operation of the first other node.

Both the activation control unit and monitor unit of each node control in such a way that a first node may monitor the operation of a second node, the second node may monitor the operation of the first node or a third node, and after that such a monitoring relation is established in order, and one closed-looped logical monitoring network can be constructed.

By adopting such a configuration, the operating status of all the nodes operated in a system can be monitored and a highly reliable monitor system can be constructed.

BRIEF DESCRIPTION OF THE DRAWINGS

FIG. 2 shows an example of an address management table.

FIG. 6 is a flowchart showing the process at the time of failure of the preferred embodiment.

FIG. 7 is a flowchart showing the resource duplication process of the master node.

FIG. 10 shows an example of the setting of the contents of a schedule table.

FIG. 11 shows the node setting screen.

DESCRIPTION OF THE PREFERRED EMBODIMENTS

Figure 1:
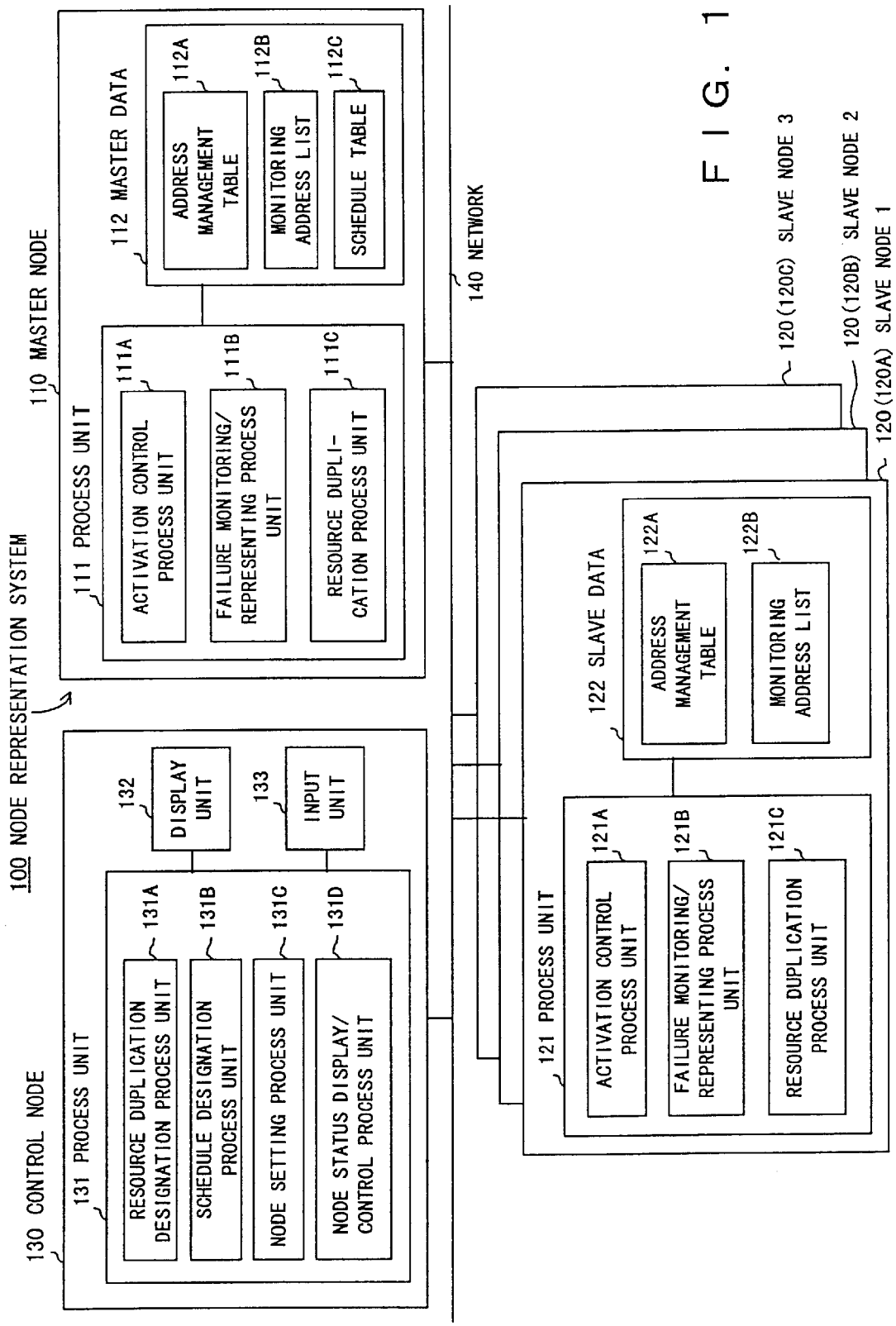
FIG. 1 is a block diagram showing the system configuration of a node representation system of the preferred embodiment of the present invention.

Examples of the embodiments of the present invention are described below with reference to the drawings. The same and similar units in each diagram are attached with the same reference numerals and symbols.

FIG. 1 is a block diagram showing the system configuration of a node representation system of the preferred embodiment of the present invention. A node representation system 100 comprises a master node 110, a plurality of slave nodes 120 (a slave node 1 (120A), a slave node 2 (120B), a slave node 3 (120C) . . . ), a control node 130 and a network 140.

In the following description, when slave nodes are generally or collectively referred to, a term of "slave nodes 120" is used, and when an individual slave node is specifically referred to, terms of a "slave node 1", a "slave node 2", etc. are used.

The master node 110, the plurality of slave nodes 120 and the control node 130 are connected to the network 140. Here, the network 140 includes all forms and scales of networks, such as the Internet connectable with a plurality of users/computers/nodes, LANS, metropolitan area networks (MANs), WANS, etc.

In the node representation system 100 of the preferred embodiment, out of a plurality of nodes on the network 140, one is designated to be a master node 110 and the others slave nodes 120. When being simply referred to as a "node" in the following description, a node indicates a node being a general concept including both the master node 110 and the slave nodes 120. In addition to the master node 110 and slave nodes 120, the control node 130 can be arbitrarily set. To each node on the network 140 an address for uniquely identifying each node on the network 140 can be assigned. Out of these, a real address is an address corresponding to each set of hardware peculiar to a node, and a virtual address is a unique address which is used in processes, such as network communications, etc. by functions usually provided by each node, and can be temporarily set. The transmission and reception of data and instructions between nodes can be performed using either of the real and virtual addresses.

Although in this preferred embodiment, both a real IP address and a virtual IP address are used for the above real address and virtual address, these are used only to exemplify IP addresses used in TCP/IP protocols which have become particularly popular along with the recent spread of the Internet. Therefore, as long as nodes connected to the network can be specified by using a certain protocol on a predetermined network, any other kinds of addresses which can be used in this protocol, can also be used.

The master node of this preferred embodiment comprises a process unit 111 and master data 112. The process unit 111 includes process units, such as an activation control process unit 111A, a failure monitoring/representing process unit 111B, resource duplication process unit 111C, etc. The master data 112 includes an address management table 112A, a monitoring address list 112B, a schedule table 112C, etc.

When the master node 110 is activated, the activation control process unit 111A refers to an address in the address management table 112A, and sets up in such a way that the master node 110 may function as a master node and may monitor a node with a specific address.

When the master node 110 detects a failure in a slave node 120, the failure monitoring/representing process unit 111B takes over and performs both the functions provided by the slave node 120 stopped due to the failure, and the monitoring of a node to be monitored by the slave node 120.

The resource duplication process unit 111C transmits a resource duplication request to a slave node 120 whose resource is to be duplicated, makes another slave node 120 or the master node 110 represent both the functions (services) provided by the slave node 120 and the monitoring of other nodes when each slave node 120 stops by receiving the notice, and simultaneously duplicates the latest resource stored in the master node to each slave node 120.

Next, each of data in master data 112 is described. The address management table 112A is a table whose entries comprise an address name and an IP address as shown in FIG. 2. For example, an IP address whose address name corresponds to the entry of a master virtual IP address, is 172. 16. 0. 1, and this is an address used for a node to function as a master node 110. For example, an IP address whose address name corresponds to the entry of a node 1 real IP address, is 172. 16. 1. 1, and an IP address whose address name corresponds to the entry of a node 1 virtual IP address, is 172. 16. 2. 1. These IP addresses are the real IP address and virtual IP address of a certain node (for example, a master node 110). For example, an IP address whose address name corresponds to the entry of a node 2 real IP address, is 172. 16. 1. 2, and an IP address whose address name corresponds to the entry of a node 2 virtual IP address, is 172. 16. 2. 2. These IP addresses are the real IP address and virtual IP address of another node (for example, a slave node 1 being one of a slave node 120), and in the same way, for succeeding entries a set of a real IP address and a virtual IP address assigned to each node is set.

The monitoring address list 112B stores the real IP addresses of nodes monitored by the node (the master node 110 here). Although usually the monitoring address list 112B includes a real IP address of an entry next to an entry in which the virtual IP address (the node 1 virtual IP address) of the master node 110 in the address management table 112A, that is, the real IP address of the slave node 1 is set, when a failure occurs in the node of a real IP address to be monitored, the real IP address of a node to be monitored by the failed node is also included in this list 112B.

The schedule table 112C stores for each node schedules designated by the schedule designation process unit 131B of a control node 130, described later. These schedules define when and how what job is performed by which node. The contents of this table 112C can also be designated in advance, and can be stored in the master node 110, the control node 130 or in other storage media appropriately located.

The slave node 120 of this preferred embodiment comprises a process unit 121 and data for slave, 122. The process unit 121 includes process units, such as an activation control process unit 121A, a failure monitoring/representing process unit 121B, a resources duplication process unit 121C, etc. The slave data 122 includes an address management table 122A and a monitoring address list 122B.

As shown in FIG. 1, a plurality of slave nodes 120 can be set up besides a slave node 1 (120A) (for example, a slave node 2(120B), a slave node 3 (120C), . . . ), and the configuration of each of the slave nodes 120 is the same as that of the slave node 1 (120A). The slave node 1 (120A) is described below.

The activation control process unit 121A obtains and refers to the control table 112A in the master node 110 when the slave node 120 is activated, refers to the address management table 122A in its own node, and sets the node so as to function as a slave node 120 and to monitor a node with a specific address. At this case, when the address management table 112A of the master node 110 is obtained and referred to, the contents are stored as the address management table 122A in the slave node 120.

When detecting a failure in another node, the failure monitoring/representing process unit 121B takes over and performs both functions provided by the node stopped due to the failure and the monitoring of nodes to be monitored by the node. When the stopped node is a master node 110, the slave node 120 is set so as to also function as a master node 110.

When receiving a resource duplication request from the master node 110, the resource duplication process unit 121C stops its own node. Then, after updating its own resource to a resource received from the master node 110, the resource duplication process unit 121C restarts functions to be provided by its own node which have been represented by the master node 110.

Next, each of data in the slave data 122 is described. As described earlier, the address management table 122A is a copy of the address management table 112A in the master data 112 of the master node 110, and has the same contents and configuration as those of the table 112A.

The monitoring address list 122B stores the real IP addresses of nodes monitored by the node (a slave node 120 here). Usually the monitoring address list 122B includes the real IP address (for example, a node 3 real IP address) of an entry next to an entry in which the virtual IP address (for example, a node 2 virtual IP address) of the node in the address management table (112A or 122A). However, when a failure occurs in a node to be monitored, the monitoring address list 122B also includes the real IP address of the node which is to be monitored by the node and in which the failure has occurred.

Next, the control node 130 of this preferred embodiment is described. The control node 130 comprises a process unit 131, a display unit 132 and an input unit 133. The process unit 131 includes process units such as a resource duplication designation process unit 131A, a schedule designation process unit 131B, a node setting process unit 131C, a node status display/control process unit 131D, etc.

The resource duplication designation process unit 131A provides an interface for displaying a resource duplication designation screen on the display unit 132 of the control node 130 in order to duplicate a desired resources from the master node 110 to the slave node 120, and enabling a user, such as a system manager, etc. to instruct the master node 110 to execute a resources duplication process for a designated slave node 120 from the input unit 133 through the screen. According to the user's instruction the resources duplication designation process unit 131A activates the resources duplication process unit 111C of the master node 110 and the resources duplication process unit 121C of the slave node 120 described earlier, and make the process units duplicate a resource from the master node 110 to slave node 120.

The schedule designation process unit 131B provides an interface for displaying a designation screen for a user, such as a system manager, to input a schedule on when and how what job is performed by which node from the display unit 132 of the control node 130, and enabling the user to input the schedule from the input unit 133 through the designation screen. The schedule designation process unit 131B stores the schedule set up by the user through the interface in the schedule table 112C of the master node 110 through the network 140, and makes the master node 110 execute the designated job for the designated node at a designated time according to the schedule.

The node setting process unit 131C provides an interface for displaying a node setting screen used for a user, such as a system manager, etc. to decide for each node whether or not to set the node as the master node 110, and to set up the real IP address and virtual IP address of the node (a master virtual IP address and a node virtual IP address), the real IP address to be monitored, etc., and enabling the user to input the setting information on the node setting screen from the input unit 133. The contents set up by the user are reflected in the address management table 112A of the master node 110, etc.

The node status display/control process unit 131D displays a status as to whether or not each node normally operates, or is represented to operate, on the display unit 132, and makes modifications, such as the stopping of each node, etc. possible through the display screen. The node status display/control process unit 131D displays a node status display/control screen on the display unit 132 of the control node 130, and enables a user, such as a system manager, etc. to control the operation of each node through the master node 110, etc. on the screen according to the designation information inputted from the input unit 133.

The display unit 132 is usually a display device, such as a CRT display, a liquid crystal display (LCD), etc., and the input unit 133 is an input device, such as a keyboard, a mouse, etc. for inputting instructions on the display screen of the display unit 132.

Next, examples of this preferred embodiment are described in detail with reference to FIGS. 3 through 12.

Figure 3:
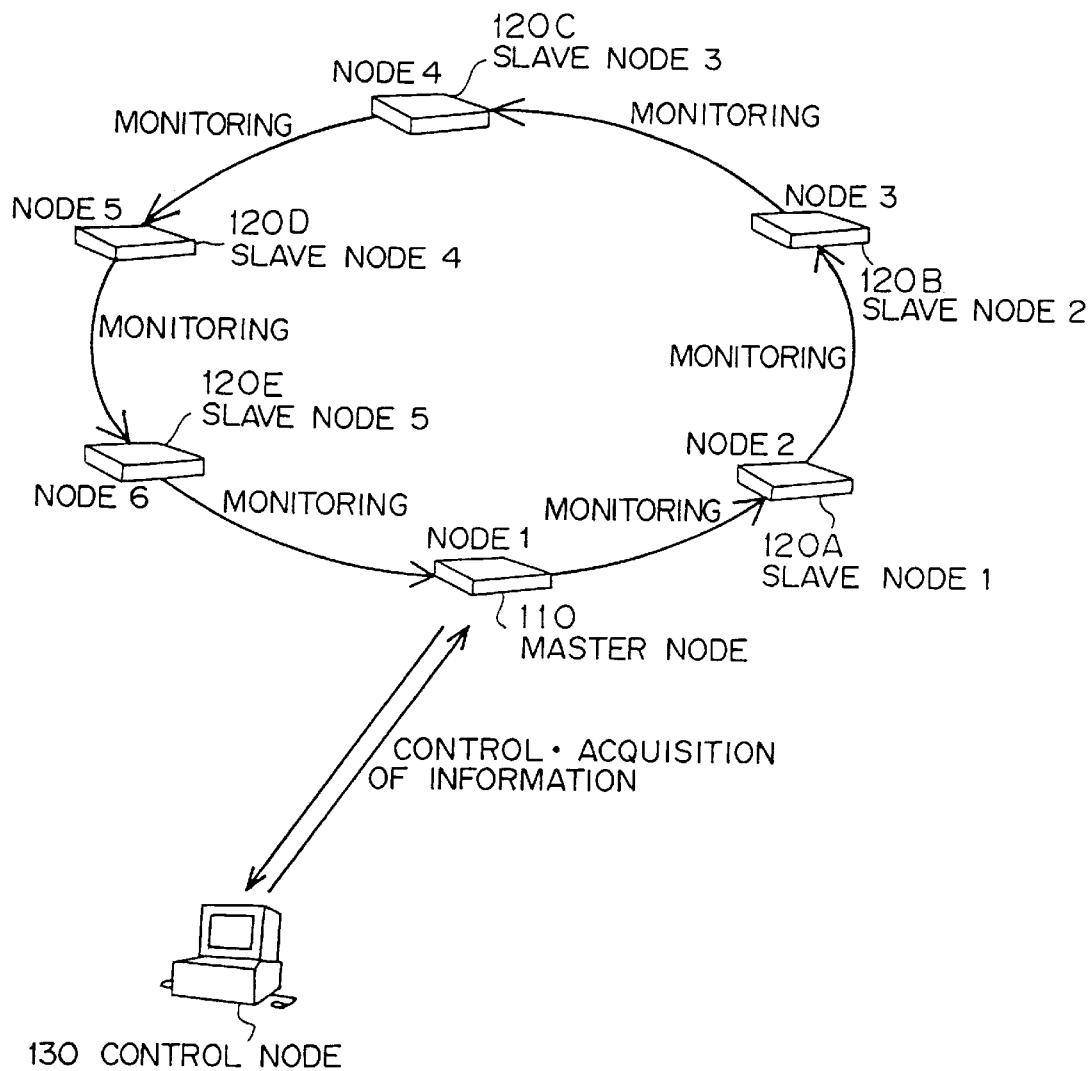
FIG. 3 conceptually shows the mode of the node monitoring of the preferred embodiment.

FIG. 3 logically and conceptually shows the mode of the node monitoring of the preferred embodiment. First, node 1 and nodes 2 through 6 are defined as a master node 110 and slave nodes 1 through 5, respectively. This example is set up in such a way that in a logical ring-shaped network node 1 may monitor node 2, node 2 may monitor node 3, node 3 may monitor node 4, and after that, in the same way, a node may monitor a preceding node. This monitoring form is based on information set on the address management table 112A or 122A, that is, a rule of monitoring a node with the real IP address of an entry next to an entry in which the virtual IP address of each node is set (provided, however, that the node of the last entry monitors a node with the real IP address of an entry next to the leading entry (master virtual IP address) of the address management table 112A or 122A).

Although in FIG. 3, nodes 1 to 6 are connected by a transmission medium indicated by an arrow mark with a solid line showing the monitoring direction of each node and it looks as if nodes are connected in a ring-shape as a whole, it is noted that this is only a logical connection form indicating monitoring status and does not show that nodes are physically connected by a ring-shaped LAN. Each node can be connected in a network connection form of a ring-shape, star-shape, bus-shape and any other arbitrary topology. Since monitoring is performed using the real IP address of a node to be monitored, the monitoring has no relation with both a connection form of nodes and a connection route of nodes.

Figure 4:
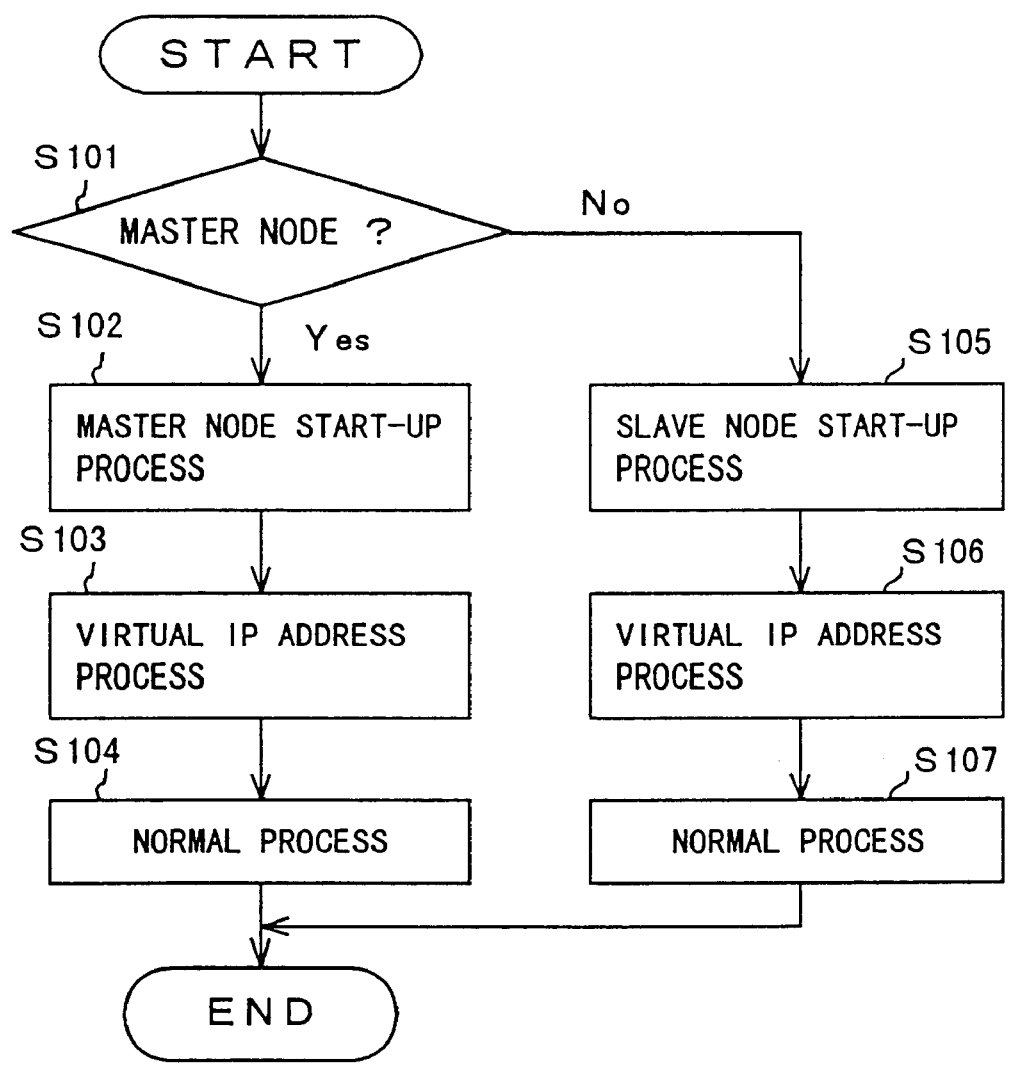
FIG. 4 is a flowchart showing the process of the activation control function of both master and slave nodes.

FIG. 4 is a flowchart showing the processes of the activation control process units 111A and 121A of both master and slave nodes, respectively. Both the master node 110 and the slave node 120 judge whether its own node is set as a master node 110 or a slave node 120 when power is turned on or when the nodes are re-activated (step S101). This is performed by judging whether or not there is in the storage unit of each node, master identification information indicating that its own node is a master node or judging based on the master identification information indicating which node is the master node 110 stored in the common storage area, etc. of a data server, etc. As described earlier, this information (not shown in FIG. 4) is set by the node setting process unit 131C of the control node 130.

When it is judged whether or not the node powered-on or re-activated is a master node 110 and the node is found to be a master node 110 (Yes in step S101), the process proceeds to a master start-up process (step S102). In the master start-up process, basically a normal start-up process (the activation of an operating system (OS), the initialization of a network interface board, etc.) is performed. Then, the process proceeds to step S103, and a virtual IP address process is executed. This process performs an address process of the master node 110, whose details are described later with reference to FIG. 5. When this process is completed, the execution of the process to be usually performed by the node is started (step S104).

If the node is a slave node 120 (No in step S101), the process proceeds to a slave node start-up process (step S105). In the slave node start-up process, basically a normal start-up process (the activation of an operating system (OS), the initialization of a network interface board, etc.) is performed. Then, the process proceeds to step S106, and a virtual IP address process is executed. This process performs an address process of the slave node 120, whose details are described later with reference to FIG. 5. When this process is completed, the execution of the process to be usually performed by the node is started (step S107).

The normal processes in steps S104 and S107 are terminated by the shutdown, etc. of the node.

Figure 5:
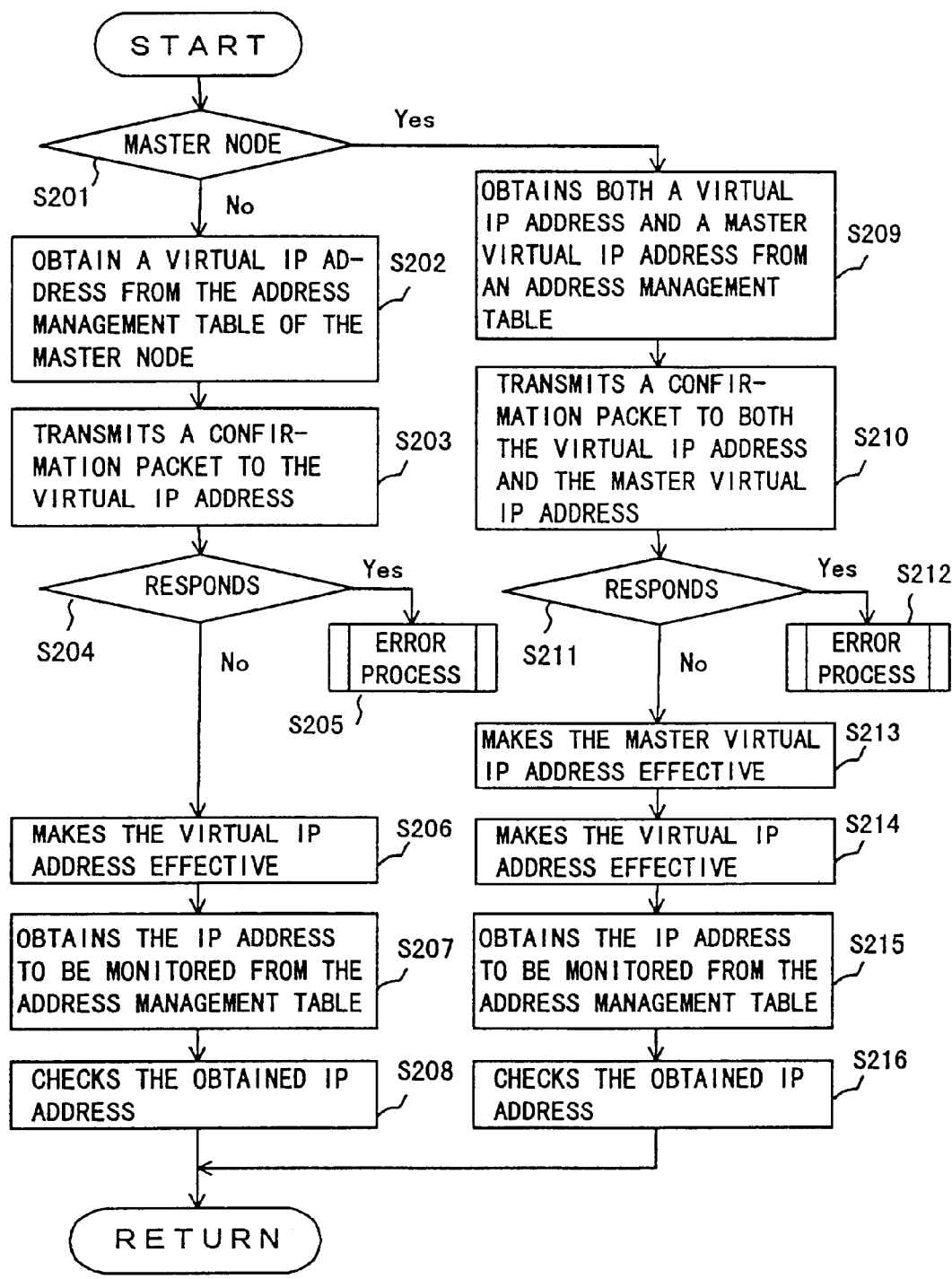
FIG. 5 is a detailed flowchart showing the virtual IP address process of both the master and slave nodes shown in FIG. 4.

FIG. 5 is a detailed flowchart showing the virtual IP address process of a master (step S103) and the virtual IP address process of a slave nodes (step S106) shown in FIG. 4. First, in step S201, it is judged whether a node is a master node 110 or a slave node 120.

If the node is judged to be a slave node 120 (No in step S201), in step S202, a virtual IP address corresponding to the real IP address of its own node is obtained from the address management table 112A of the master node. To simplify the description, it is presumed here that the master node 110 effectively operates when the process of step S202 is executed. If at this time there is no master node 110 or a master node is not normally operating, countermeasures, such as reporting the non-operation of the master node 110 to another node, waiting for the operation of the master node 110, making another node operate as the master node, etc. can be taken. Although due to the non-operation of the master node 110, the address management table 112A in the master node 110 cannot also be referred to, in this case, the address management table 122A of the slave node 120 can be used. Then, in step S203, a confirmation packet is transmitted to the virtual IP address. Then, whether or not there is a response to the packet, is judged (step S204), and if there is a response to the packet (Yes in step S204), it indicates that the virtual IP address is already used by another node and cannot be used by the node. In this case, the process proceeds to step S205, and a predetermined error process, such as reporting this event, is performed. For this error process, a variety of modes can be considered, whose detailed description is omitted here.

If there is no response to the packet (No in step S205), it indicates that the virtual IP address is not used by another node, and in step S206, the virtual IP address is made effective. By making this virtual IP address effective, another node connected to the node through the network 140, etc. can access the node by using this virtual IP address. Conversely, if this virtual IP address is nullified by the node, another node can use this virtual IP address, and the node can no longer be accessed by using the virtual IP address.

Then, the real IP address of a node to be monitored is obtained from the address management table 112A (step S207), and whether or not a node with the real IP address normally operates, is verified by a health check (step S208). This health check is performed at predetermined time intervals even after the process proceeds to a normal process (step S107) shown in FIG. 4.

A node to be monitored at this time is a node with the real IP address set to an entry next to an entry in which a virtual IP address corresponding to each node is set in the address management table 112A. Since the slave node 120 are assumed to be nodes 2 to 6 here, in the example of an address management table 112A shown in FIG. 2, node 2 monitors a node with a node 3 real IP address (node 3), node 3 monitors a node with a node 4 real IP address (node 4), and after that, in the same way, nodes to be monitored are determined, and lastly node 6 monitors a node with a node 1 real IP address (that is, the master node 110).

If a node is judged to be a master node 110 (Yes in step S201), in step S209, both a virtual IP address corresponding to the real IP address of its own node and a master virtual IP address are obtained from the address management table 112A of the master node 110.

Then, in step S210, confirmation packets are transmitted to both the virtual IP address corresponding to its own real IP address and the master virtual IP address (step S210). Then, whether or not there is a response to these packets, is judged (step S211), and if there is a response from either of the virtual IP addresses (Yes in step S211), it indicates that the virtual IP addresses are already used by other nodes and cannot be used by the node. In this case, the process proceeds to step S212, and the same predetermined error process as that in step S204 is executed. The detailed description of this error process is omitted.

If there is no response to both the confirmation packets (No in step S211), it indicates that those virtual IP addresses are not used by other nodes, and in step S213, the master virtual IP address is made effective, and in step S214, the virtual IP address is made effective. By making these virtual IP addresses effective, other nodes connected to the node through the network 140, etc. can access the node using these virtual IP addresses. Conversely, if these virtual IP addresses are nullified by the node, another node can use these virtual IP addresses, and the node can no longer be accessed by using these virtual IP addresses.

Then, the real IP address of a node to be monitored is obtained from the address management table 112A (step S215), and whether or not the real IP address is effective, is verified by a health check (step S216). This health check is performed at predetermined time intervals even after the process proceeds to a normal process (step S104) shown in FIG. 4.

A node to be monitored at this time is a node with the real IP address set to an entry next to an entry in which a virtual IP address of the node is set, in the address management table 112A. Since the master node 110 is assumed to be node 1 here, in the example of an address management table 112A shown in FIG. 2, the master node 110 monitors a node with a node 2 real IP address (node 2).

The process shown in FIG. 5 is executed for each node on the network 140, and when the process returns to the normal process shown in FIG. 4 (steps S104 and S107), the system of this preferred embodiment enters a normal operation state. Each node regularly performs a health check of the real IP addresses of nodes to be monitored, and monitors the failure and other abnormalities of the nodes.

Next, a process flow at the time of a failure is described with reference to FIG. 6. This flow shows a flow of a process to be activated when a failure, etc. is detected in each node, and is terminated when the process is completed.

A first pattern of a failure occurrence is a case where a failure occurs in a slave node 120. Here, a case is taken where node 3 fails, node 4 fails, and then node 3 is restored while node 4 is still failed.

When a failure occurs in node 3, node 2 monitoring node 3 detects the abnormality (step S301). Then, node 2 obtains a virtual IP address corresponding to node 3 (node 3 virtual IP address) from its own address management table 122A or the address management table 112A of the master node 110 (step S302). Then, in node 2, the virtual IP address of failed node 3 is made effective (step S303). Thus, node 2 can represent the functions originally provided by node 3.

Then, node 2 obtains the real IP address of node 4 monitored by node 3 (that is, the node 4 real IP address of an entry next to an entry in which a node 3 virtual IP address is set, in the address management table 112A) from its own address management table 122A or the address management table 112A of the master node 110 (step S304), and adds the real IP address to the monitoring address list 122B of node 2 (step S305). Thus, node 2 also monitors failures in node 4 to be originally monitored by node 3, and transmits a heart beat signal (health signal) to the node 4 real IP address (node 4) at predetermined time intervals after that until node 3 is restored.

Then, node 2 proceeds to step S306, and judges whether or not a node farthest away from node 2 among nodes to be monitored, that is, the real IP address of node 4 (node 4 real IP address) here, responses to the heart beat signal. A "node farthest away from node 2" means a node in which a real IP address is set in an entry farthest away from an entry in which a node 2 real IP address is set, among nodes monitored by node 2 in the array of the address management table 112A, that is, a node to be monitored, located last in the monitoring direction in a logical network shown in FIG. 3. At this time, node 2 is monitoring node 3 and node 4, and as seen from FIGS. 2 and 3, it is node 4 that is farthest away from node 2.

When node 2 monitors a master node 110 (node 1) and other slave nodes 120 (nodes 3 through 6), it is node 1 that is farthest away from node 2, as can be easily seen from FIG. 3.

If in step S306, a node 4 real IP address responds to the heart beat signal (Yes in step S306), that is, if node 4 is normally operating, it is judged whether or not the real IP address of the other node to be monitored (node 3 real IP address here) responds to the heart beat signal (step S307). If there is no response (No in step S307), that is, node 3 is still failed, node 2 returns to the judgement of step S306, then performs the judgement of step S307, and repeats these two judgements unless the status of a node to be monitored changes.

When in this state a failure occurs in node 4, this fact is detected in step S306 (No in step S306), node 2 proceeds to step S301, and in the same way as described earlier, a setting is made to represent node 4. In step S302, node 2 obtains a virtual IP address corresponding to node 4 (node 4 virtual IP address) from its own address management table 122A or the address management table 112A of the master node 110. Then, in node 2, the virtual IP address of failed node 4 is made effective (step S303). Thus, in addition to the functions of node 3, node 2 can represent the functions originally provided by node 4.

Then, node 2 obtains the real IP address of node 5 monitored by node 4 (the 5 real IP address of an entry next to an entry in which a node 4 virtual IP address is set, in the address management table 112A) from its own address management table 122A or the address management table 112A of the master node 110 (step S304), and adds the real IP address to the monitoring address list 122B of node 2 (step S305). Thus, in addition to the monitoring of failures in node 4 to be originally monitored by node 3, node 2 monitors failures in node 5 to be originally monitored by node 4, and after that transmits a heart beat signal to a node 3 real IP address (node 3), a node 4 real IP address (node 4) and a node 5 real IP address (node 5) at predetermined time intervals while both node 3 and node 4 are failed.

Then, node 2 proceeds to step S306, and judges whether or not a node farthest away from node 2 among nodes to be monitored, that is, the real IP address of node 5 (node 5 real IP address) here, responds to the heart beat signal. A "node farthest away from node 2" has the same meaning as described earlier.

If in step S306, a node 5 real IP address responds to the heart beat signal (Yes in step S306), that is, if node 5 is normally operating, it is judged whether or not the real IP addresses of other nodes to be monitored (both node 3 real IP address and node 4 real IP address here) respond to the heart beat signal (step S307). If there is no response (No in step S307), that is, if both node 3 and node 4 are still failed, node 2 returns to the judgement of step S306, then performs the judgement of step S307, and repeats these two judgements unless the status of either of the nodes to be monitored changes.

Next, a case is considered where only node 3 is restored from the state where both node 3 and node 4 fail, and normally operates. When node 3 starts normally operating again, the node 3 real IP address is made effective, and in the judgement of step S307, node 2 detects the fact (Yes in step S307). Then, node 2 nullifies both node 3 virtual IP address which has responded and the virtual IP address of a node representing the functions of a node far away from node 3 (node 4 virtual IP address here) among effective virtual IP addresses, and terminates the representation of the functions of both nodes 3 and 4 (step S308). Furthermore, the real IP addresses of nodes far away from node 3 which has responded, that is, both the real IP address of node 4 (node 4 real IP address) and the real IP address of node 5 (node 5 real IP address) are deleted from the monitoring address list 122B (step S309) to prevent node 2 from monitoring these nodes.

The processes of both step S308 and step S309 here are designed to entrust nearer node 3 in the address management table 112A with both the representation of the functions of node 4 still failed and the monitoring of node 5 to be monitored by node 4 by a restoration of node 3. When being restored from the failure and activated, as described earlier with reference to FIG. 5, node 3 obtains both a virtual IP address corresponding to its own real IP address (node 3 virtual IP address) and the real IP address of a node to be monitored (node 4 real IP address) from its own address management table 122A or the address management table 112A of master node 110, immediately detects the failure in node 4, and starts the representation process shown in FIG. 6.

Then, in step S310, node 2 judges whether or not the number of the real IP address to be monitored becomes one (the number of nodes to be monitored becomes one), that is, whether or not node 2 is restored to its normal status. If the number is not one (No in step S310), node 2 returns to the judgement of step S306, while if the number is one (Yes in step S310), node 2 terminates the process, and returns to a normal node monitoring.

A second pattern of failure occurrence is a case where a failure occurs in a master node 110. Here, a case is considered where node 1 fails, and then node 1 is restored. When a failure occurs in node 1, node 6 which is a slave node 120 monitoring node 1 detects the abnormality (step S301). Then, node 6 obtains both a virtual IP address corresponding to node 1 (node 1 virtual IP address) and a master virtual IP address from the address management table 122A of node 6 (step S302). Then, in node 6, both the virtual IP address of failed node 1 and the master virtual IP address are made effective (step S303). If at this time these virtual IP addresses are already used, node 6 can be set to perform a predetermined error process. Thus, node 6 can represent both functions originally provided by node 1 and functions as a master node 110.

Then, node 6 obtains the real IP address of node 2 monitored by node 1 (that is, a node 2 real IP address of an entry next to an entry in which a node 1 virtual IP address is set, in the address management table 122A) from the address management table 122A (step S304), and adds the real IP address to the monitoring address list 122B of node 6 (step S305). Thus, node 6 also monitors failures in node 2 originally monitored by node 1, and transmits a heart beat signal to a node 2 real IP address (node 2) at predetermined time intervals after that until node 1 is restored.

Then, node 6 proceeds to step S306, and judges whether or not a node 2 real IP address responds to the heart beat signal. If in step S306, the node 2 real IP address responds to the heart beat signal (Yes in step S306), that is, if node 2 is normally operating, it is judged whether or not the real IP address of another node to be monitored (node 1 real IP address here) responds to the heart beat signal (step S307). If there is no response (No in step S307), that is, if node 1 is still failed, node 6 returns to the judgement of step S306, then performs the judgement of step S307, and repeats these two judgements until the status of a node to be monitored changes.

When in this state, node 1 is restored from the failure and starts normally operating again, a node 1 real IP address becomes effective, and in the judgement of step S307, node 6 detects the fact (Yes in step S307). Then, node 6 nullifies both the virtual IP address of node 1 which has responded and a master virtual IP address among effective virtual IP addresses, and terminates the representation of the functions of both node 1 and the master node 110 (step S308). Furthermore, the real IP address of a node to be monitored, far away from node 1 which has responded, that is, the real IP address of node 2 (node 2 real IP address) is deleted from the monitoring address list 122B (step S309) to prevent node 6 from monitoring this node 2.

When restored from s failure, as described earlier with reference to FIG. 5, node 1 obtains a real IP address corresponding to its own real IP address (node 1 virtual IP address), a master virtual IP address and the real IP address of node 2 to be monitored (node 2 real IP address) from its own address management table 112A, makes effective both the virtual IP address and the master virtual IP address after confirming that there is no response to a confirmation packet for the virtual IP address corresponding to its own node, and operates as a master node 110.

Furthermore, in this preferred embodiment, resource duplication between nodes can be performed for a plurality of nodes on a network 140 by using a control node 130. In this preferred embodiment, the control node 130 can give instructions to only one master node 110. When a certain resource is duplicated from the master node 110 to each slave node 120, the master node 110 compulsorily represents those processes in order not to stop the functions provided by each slave node 120. Thus, a user can continue to use the functions provided by each slave node 120 even while the slave node 120 is duplicating the resource.

The flow of the resource duplication process is described with reference to FIGS. 7 and 8. It is assumed that a master node 110 is designated to be node 1, and node 1 is provided with the latest resource (contents) for duplication. In this case, a resource actually operated in node 1 and the latest resource is assumed to be different.

First, as shown in FIG. 7, in node 1 being a master node 110, a series of processes from step S401 to step S404 are executed in the same way as in each of nodes 2 through 6 of a slave node 120. In step S401, a resource duplication request is transmitted from the master node 110 to the slave nodes 120. Then, as shown in FIG. 8, each slave node 120 receives this request (step S501), and nullifies its own virtual IP address (step S501). Then, each slave node 120 notifies the master node 110 of the completion of nullification of its own virtual IP address (step S503).

Referring back to FIG. 7, the master node 110 receives the completion notice (step S402). Then, the master node 110 makes effective the virtual IP address of the slave node 120 which has transmitted the termination notice (step S403), and represents the functions of the slave node 120. Then, the duplication process of the latest resource is executed for the slave node 120 (step S404). This resource is information used regarding the functions provided by each slave node 120.

When the duplication process is completed for all the slave nodes 120, the virtual IP addresses of all the slave nodes 120 are nullified in order to terminate the representation of the functions of all the slave nodes 120 (step S405).

Figure 8:
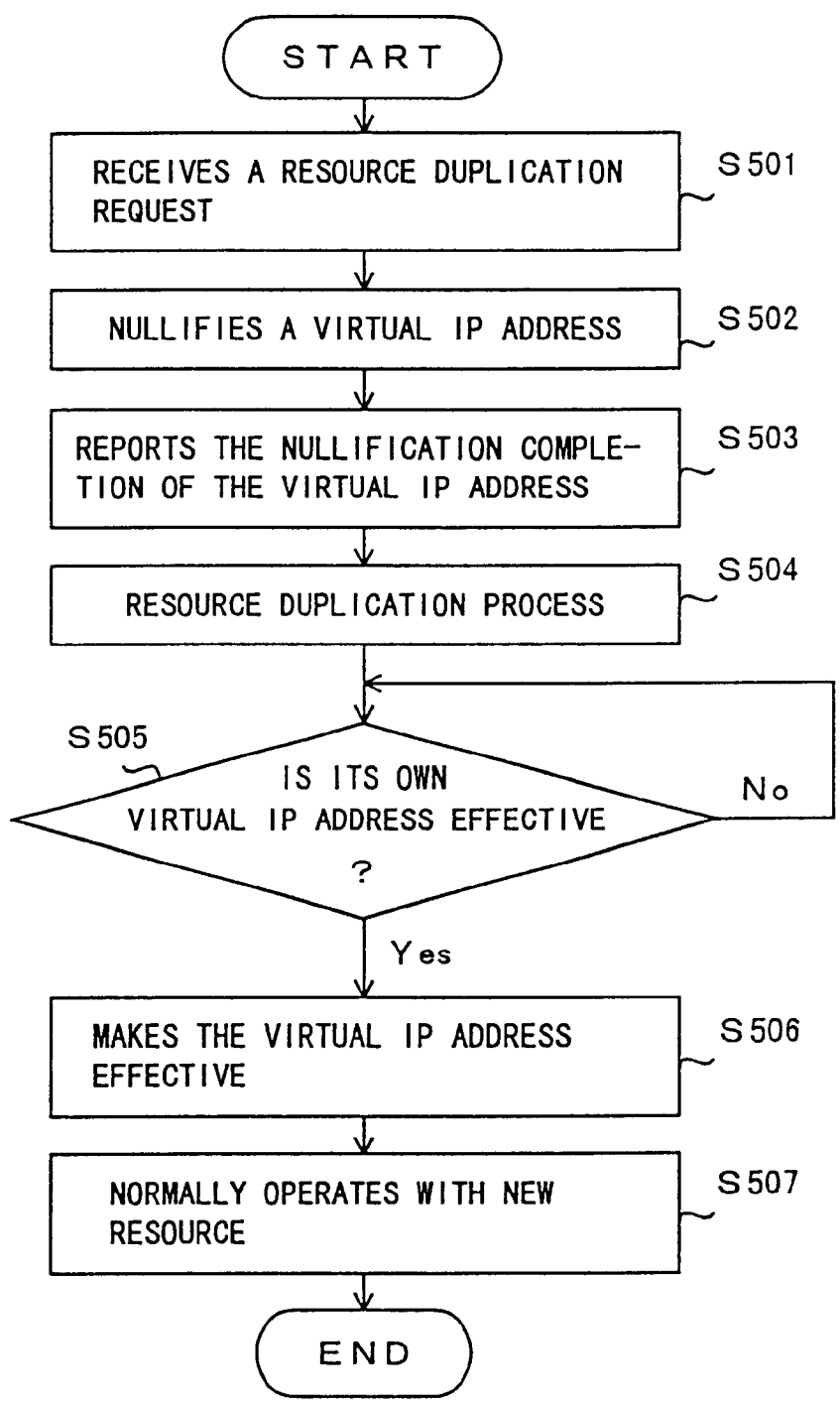
FIG. 8 is a flowchart showing the resource duplication process of the slave node.

Back in FIG. 8, in step S504, after the latest resource is duplicated, in step S505, it is judged whether or not its own virtual IP address is ineffective. If the virtual IP address is not ineffective, the process of step S505 is repeated (No in step S505). When it is judged that the virtual IP address is ineffective (Yes in step S505), the slave node 120 proceeds to step S506. In step S506, each slave node 120 makes its own virtual IP address effective, and a normal operation is started with the latest resource (step S507).

In this preferred embodiment, when duplication is completed for all the slave nodes 120, the representation of the functions of all the slave nodes 120 by the master node 110 is cancelled and the provision of functions with the latest resource of all the slave nodes 120 (and the node monitoring described earlier) are almost simultaneously performed, and thereby a merit that the update of functions (services) is almost simultaneously provided to all the users can be obtained. However, the functions can also be set to be provided in order from a slave nodes 120 which has completed the duplication of the latest resource, by appropriately controlling the timing of node monitoring, etc.

For example, the duplication of the resource of the slave node 120 can also be set to be made for each slave node 120 in order. In this case, the representation process as described earlier with reference to FIG. 6 is executed, and both the provision of functions (services) of a slave node 120 duplicating the resource, and the monitoring of other nodes can be represented by another slave node 120, etc. without interruption. As can be understood from this, the detection of an abnormality in the representation process shown in FIG. 6 means the stop of the slave node 120 due to the duplication of a resource here. Furthermore, when a slave node 120 is stopped for the purpose of maintenance, etc. (stop of operation), the stop of operation can be detected in the representation process. Therefore, such a detection process should not be limited only to the "abnormalities" of nodes in the strict sense of the word.

A method in which a master node 110 represents functions provided by each slave node 120 during a duplication process, but does not represent the monitoring of other nodes, is also available by using a multi-task process, etc. In this case, for example, a slave node executing a duplication process continues an original monitoring function by a multi-task process, etc. while duplicating a resource.

When resource duplication is performed for each slave node 120 in order, the duplication order can also be set in the order of monitoring direction. For example, in the logical network shown in FIG. 3, first the resource of a node 2 can be duplicated, then the resource of a node 3 can be duplicated, in the same way the resources of the remaining slave nodes can be duplicated one by one in order, and lastly the resource of a node 6 can be duplicated to terminate the duplication.

These duplications can also be made by simultaneously stopping not all but two or more slave nodes 120.

Back in FIG. 7 again, this time, since a master node 110 itself performs the duplication of the latest resource, the master node 110 nullifies both the virtual IP address of its own node and a master virtual IP address, makes node 6 make those virtual IP addresses effective, and requests node 6 to represent the functions provided by the master node 110 and node 1 (step S406). Although in this example, the representation of functions provided by the master node 110 and node 1 is fixed to node 6, the functions can also be represented by another slave node 120 or the functions can also be automatically represented by a slave node 120 with the lightest load at the time of representation.

Then, the master node 110 duplicates the latest resource in its own node to a running resource (step S407), makes node 6 nullify both the virtual IP address of its own node (node 1 virtual IP address) and a master virtual IP address, cancels the representation process of node 1 and the master node 110 executed by node 6, and simultaneously makes those virtual IP addresses effective in node 1 (step S408). By these processes the master node 110 starts normally operating with the latest resource (step S409).

Figure 9:
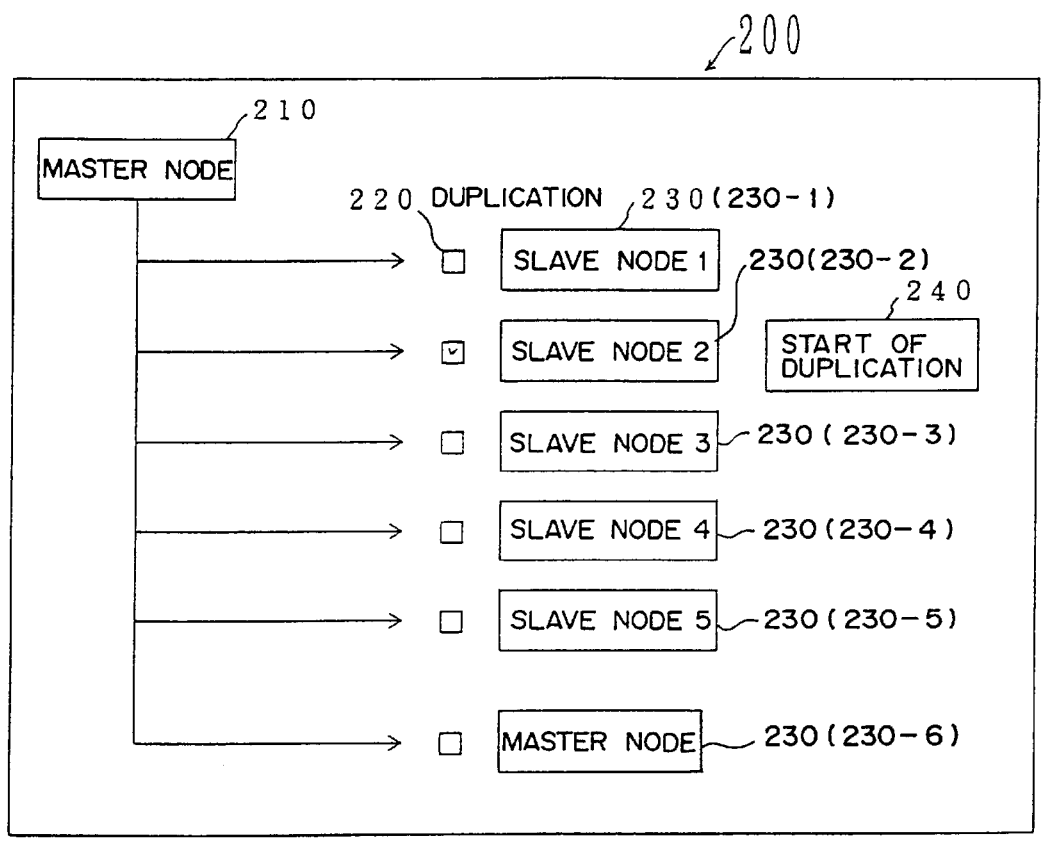
FIG. 9 shows the resource duplication designation screen.

FIG. 9 shows a resources duplication designation screen 200 being an example of the resources duplication designation screen for designating in such a resources duplication process. The resources duplication designation screen 200 comprises a duplication source 210, a duplication designation check box 220, duplication addresses 230 (230-1 to 230-6) and a duplication start button 240. The duplication source 210 indicates a node from which a resource is duplicated, and usually is a label indicated "Master node". The duplication designation addresses 230 are labels indicating nodes being duplicated. In order to duplicate the master node 110 to a certain duplication designation address 230 (for example, a slave node 2), the duplication designation check box 220 to the left of the duplication 230 address 230 (230-2) is clicked (selected) using an input unit 133, such as a mouse, etc. Such designation of duplication can also be made for an arbitrary number of slave nodes 120 and the master node 110, that is, a plurality of nodes can be simultaneously designated.

Usually, although a master node 110 is provided with the latest resource for duplication, as described above, the master node 110 is operated not by the latest resource for duplication but by a previous resource before the update while the latest resource is being duplicated to a slave node 120. Therefore, in order to switch over the running resource of the master 110 to the above latest resource for duplication, sometimes an instruction to duplicate a resource is explicitly made from the master node 110 to its own node by clicking a check box 220 corresponding to the duplication designation address 230-6 on the screen 200. When the designation of a check box 220 is completed, a "duplication start" button 240 is clicked to start a resource duplication process using an input unit 133, such as a mouse, etc.

When this button 240 is clicked, the above described latest resource for duplication is duplicated from the master node 110 to the node selected by the clicked check box 220.

As described earlier with reference to FIGS. 7 and 8, until the resource duplication process is executed for all the slave nodes 120 to be monitored, functions possessed by those nodes are represented by the master node 110. However, on this resource duplication designation screen 200, each of the slave nodes 120 can also be set to start (restart) providing the functions in order when the duplication of the latest resource is completed. Furthermore, the duplication order of a resource can also be defined for all the nodes including the master node 110.

The master node 110 can also be designated in such a way that although during the resource duplication process the master node 110 represents functions provided by each of the slave nodes 120, the master node 110 does not monitor other nodes.

Furthermore, schedule information for automatically executing this resource duplication process is stored in the schedule table 112C of the master node 110. According to this schedule information, the operation of the master node 110 and slave node 120 are controlled. This schedule information can be defined (stored) in the schedule table 112C of the master node 110 or can be designated through a designation screen (not shown) using the schedule designation process unit 131B of a control node 130. The above schedule information can also be stored in a specific node (not shown) on a network. Besides the above, many other modified examples can also be considered.

FIG. 10 shows an example of the schedule table 112C. The schedule table 112C manages the schedule of each node, and comprises node names and schedule data 1 to schedule data n. In the node names, M indicating a master node and S1 to Sn indicating a slave node 1 to a slave node n, respectively, are set. The schedule data 1 to schedule data n include each item of a job code, a date, a start time and an end time. In the job code, for example, is set the contents of a process, such as resource duplication, S3 representation, operation stop, etc., in the date is set the execution date of a job set by the job code, in the start time is set the start time of the job, and in the end time is set the end time of the job.

When schedule data 1, being an example of the schedule data shown in FIG. 10, are referred to, a slave node 3 is set so as to stop the operation from 8 am to 5 pm on Dec. 30, 1997, and to make a slave node 2 represent the functions in the same time range, and a master node 110 is set to start duplicating a resource from 10 pm on Dec. 31, 1997. Although this resource duplication targets all the slave nodes 120, a new item can be prepared as schedule data and only some nodes among all the slave nodes 120 can also be designated to be targeted.

Although in the above example of schedule data 1 the jobs of the slave nodes 2 and 3 are related to each other, in the same schedule data 1, jobs not related to other nodes can also be made to co-exist.

In schedule data 2, the designation of a "resource changeover" for a master node 110 is set. This designation is, for example, that the master node 110 should switch over its own running resource to the latest resource at midnight on Jan. 1, 1998, after completing the duplication of the latest resource to a slave node 120.

FIG. 11 shows a node setting screen 300 used to set information needed to implement the representation process described earlier for each node. The node setting screen 300 is displayed on the display unit 132 of a control node 130, and the above information is set in a plurality of nodes including a master node 110 and slave nodes 120 through this screen 300.

A master identification 310 is checked when a real IP address to be set is operated as the real IP address of the master node 110. A real IP address 320 is used to designate the real IP address of a node to be set. A virtual IP address 330 is used to designate the virtual IP address of a node to be set. A monitoring IP address 340 is used to designate the real IP address of a node to be monitored by the node to be set. Although as described earlier, in this preferred embodiment, the real IP address of a node to be monitored is basically a real IP address set in an entry next to an entry of the address management table 112A in which the virtual IP address of a node to be monitored is set, the real IP address of a node to be monitored can monitor a node with a specific real IP address by designating the node for the monitoring IP address 340.

A monitoring service 350 consists of three check boxes for each function (service) of a world wide web (WWW), a domain name system (DNS) and a mail, and is used to designate a function (service) to be monitored. Although so far, in order to simplify description, monitoring in units of nodes is described, in this way, the status can be monitored of each function by setting monitoring targets for each function. Although three functions (services) can be set here, this is just an example, and the number of functions (services) is not limited to this.

A virtual operation 360 is used to instruct whether or not to operate a node to be set, virtually. If the node is virtually operated, "Yes" is clicked, and if not, "No" is clicked. A representation 370 is used to instruct whether or not a node to be set represents other nodes. If the node represent other nodes, "Yes" is clicked, and if not, "No" is clicked.

In the control node 130, the above information is set for each node through the node setting screen 300, and such node setting information is collectively transmitted to the master node 110. The master node 110 receives this setting information, and generates/updates both the master identification information and related entries in the address management table 112A described earlier with reference to FIG. 4. As described earlier, if monitoring is set for each function, by modifying from time to time the configuration of the address management table 112A and the representation process flow, as occasion demands, the representation process can also be executed for each function.

Although in this preferred embodiment, a setting process using such a node setting screen 300 can be implemented in the control node 130 by using an Internet browser and a Java applet, the setting process using such a node setting is not strictly limited to such a software configuration. For example, instead of a Java applet an Activex control can also used.

Figure 12:
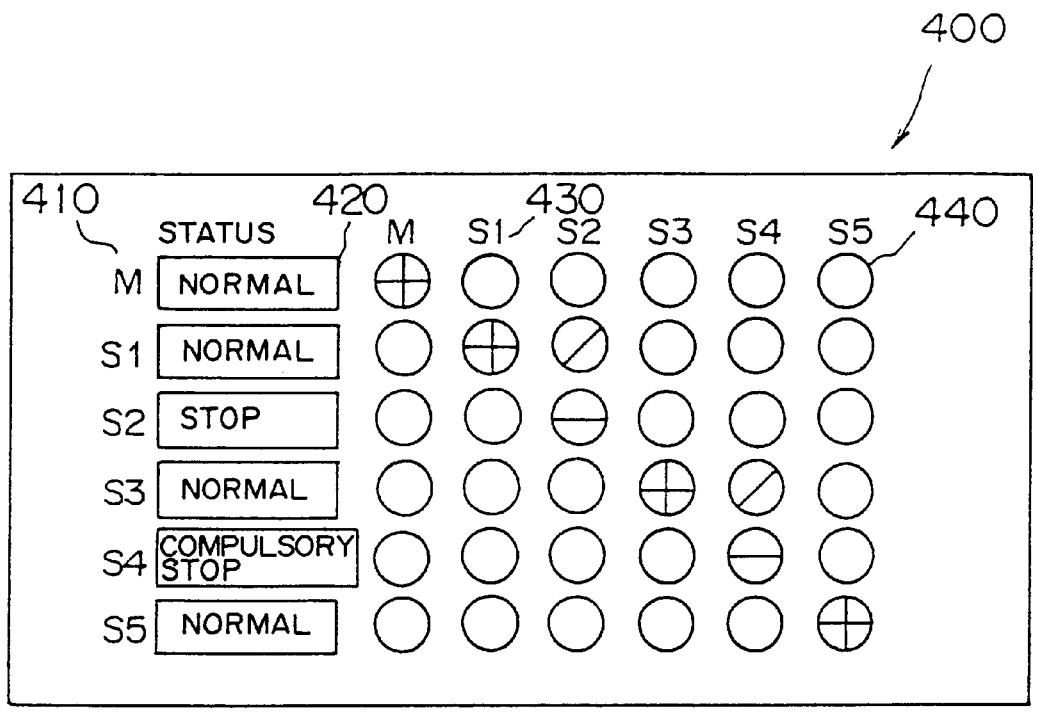
FIG. 12 shows the node status display/control screen.

Furthermore, from this control node 130 the status of each node on a network 140 can be displayed and controlled. FIG. 12 shows the node status display/control screen 400, by one screen of which the operation status of a plurality of nodes can be confirmed. By using the signal table of this screen 400 the control node 130 can request the master node 110 to obtain the operation status of each node, and from the response the operation status of each node can be dynamically generated and displayed. Furthermore, on this screen 400, the operation of each node can also be controlled, and by requesting the master node 110 to control a designated node from the control node 130, the request can be reflected to the node.

The node status display/control screen 400 shown in FIG. 12 comprises descriptions of nodes, 410 and 430, status 420 and status signals 440. For the descriptions of nodes 410 and 430 a master node, a slave node 1 and a slave node 2 are represented by symbols, such as M, S1 and S2, respectively. The status 420 displays the status of a node indicated in the description of node 410, and the display includes "normal", "stop", "compulsory stop", etc. The status signal 440 indicates in which status the functions of each node are operated, and the color blue, flashing blue and the color red indicate during operation, during representation and during stop, respectively. However, in FIG. 12, the color blue, color red, flashing blue and others are indicated by +, -,/ and O, respectively, for reasons of notation. Of course, for such a signal notation many variations can be considered, and the signal notation is not limited to these notation examples in this preferred embodiment.

When the status signal 440 located in the same column as each description of a node 430, includes the color blue or color red, it means the node possesses originally the functions to provide. Furthermore, when the status signal 440 located in the same line as each description of node 410, includes the color blue and blinking blue, it indicates functions currently actually provided by the node and functions represented by the node, respectively.

For example, in the node status display/control screen 400 shown in FIG. 12 it is found that a slave node 2 (S2) stops, and functions to be originally provided by the node are represented and operated by a slave node 1 (S1). It is also found that a slave node 4 (S4) is compulsorily stopped, and functions to be originally provided by the nodes 4 (S4) are represented and operated by a slave node 3 (S3).

By selecting a status 420 corresponding to a certain node and modifying the status through an input unit 133, such as a mouse, etc., the status of each node can be controlled. For example, by modifying the "normal" status of a node normally operating to "compulsory stop", the node can be compulsorily stopped for a certain reason. However, it has to be noted that an improper operation, such as modifying the status of a node where the node stops due to an unexpected failure, etc. to "normal" using a mouse, etc. is not available.

Figure 13:
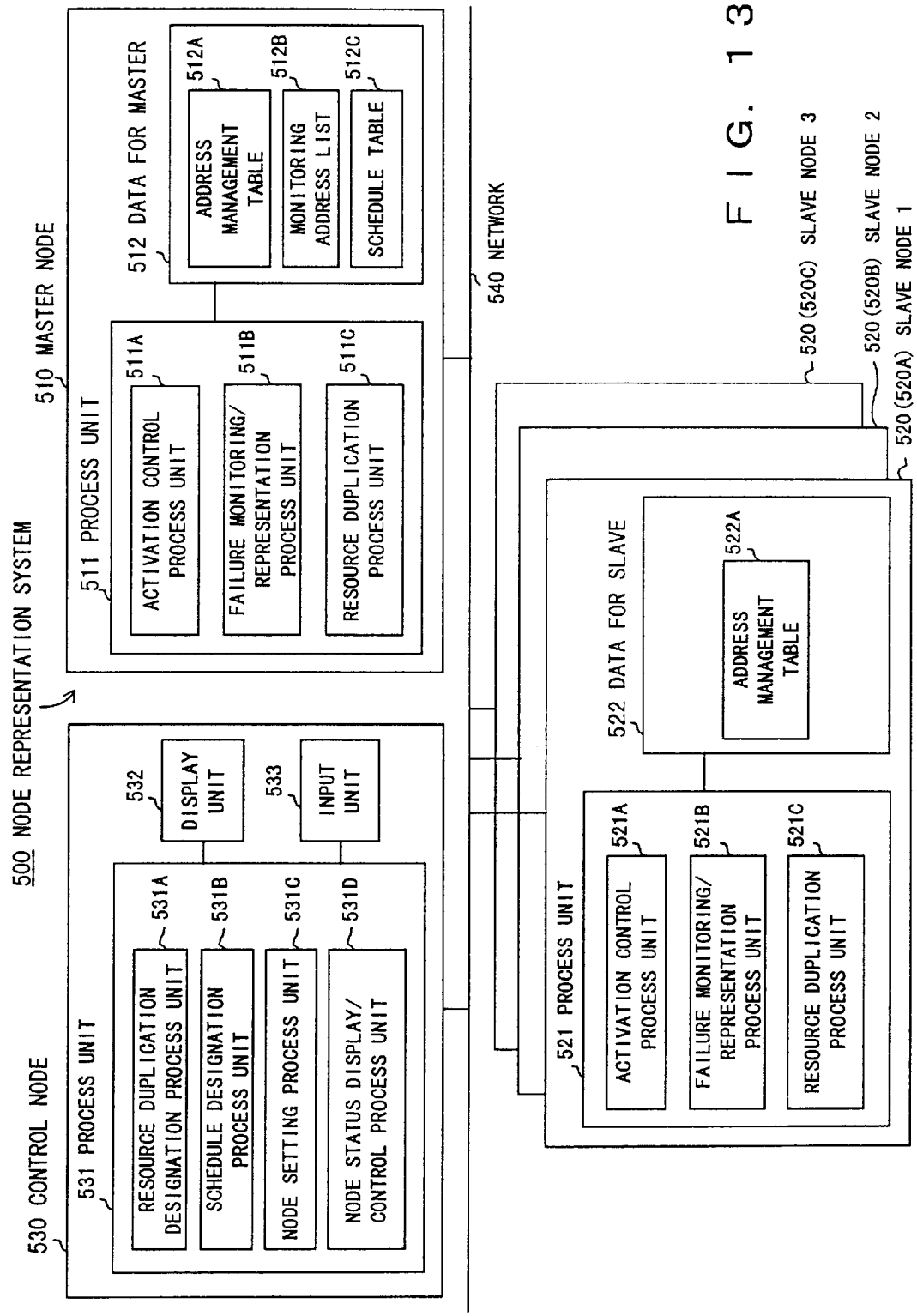
FIG. 13 is a block diagram showing the system configuration of the node representation system of another embodiment of the present invention.

FIG. 13 is a block diagram showing the system configuration of the node representation system 500 of another embodiment of the present invention, in which only a master node 510 possesses an address management table 512A. In this case, a slave node 520 obtains a virtual IP address corresponding to its own real IP address from the master node 510 through a network 540 by way of message communications, etc. A slave node 520, for example, accesses the master node 510 using the virtual IP address of the master node 510 stored in advance by its own node.

In this system, the judgement in step S101 of FIG. 4 on whether or not its own node becomes a master node, is made by judging whether or not each node stores the master identification information described earlier, etc. in its own storage unit, etc.

Figure 14:
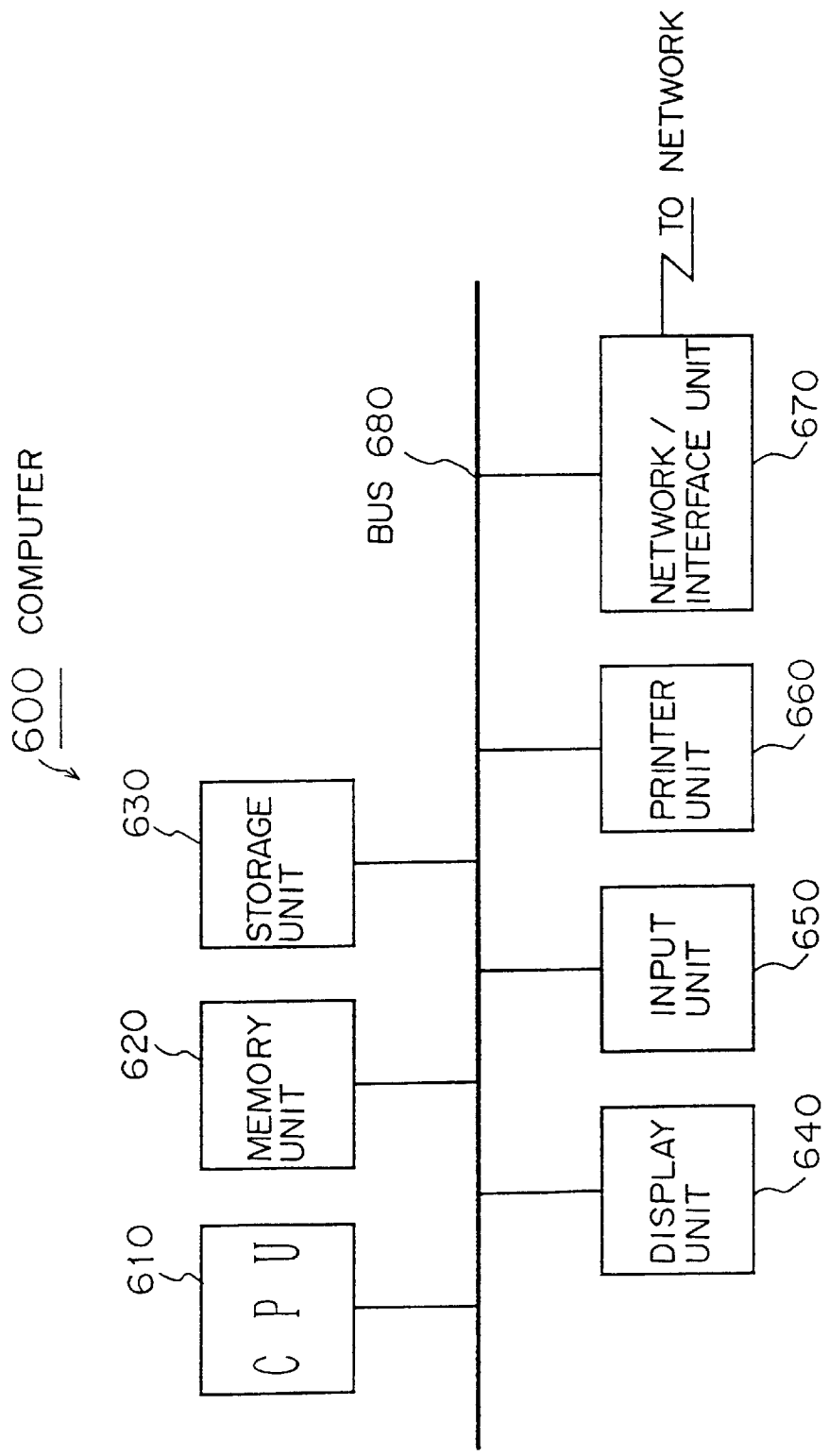
FIG. 14 shows the hardware configuration of a computer implementing a node representation system.

FIG. 14 shows an example of the hardware configuration of a computer 600 used to configure the above node representation systems 100 and 500. This computer 600 basically functions as a master node 110 or 510, a slave node 120 or 520 and a control node 130 or 530 in the above node representation system 100 or 500.

The computer 600 comprises a CPU 610, a memory unit 620, a storage unit 630, a display unit 640, an input unit 650, a printer unit 660 and a network interface unit 670, which are connected with each other by a bus 680.

The CPU 610 performs the functions of the process unit 111 or 511 of the master node 110 or 510, respectively, the process unit 121 or 521 of the slave node 120 or 520, respectively, and the process unit 131 or 531 of the control node 130 or 530, respectively, shown in FIGS. 1 and 13. The memory unit 620 is loaded with a program for implementing the above functions performed by the CPU 610, and is also loaded with the contents of an address management table 112A, 512A or 122A, a monitoring address list 112B, 512B, 122B or 522B, etc., as occasion demands.

The storage unit 630 stores a program for implementing the above functions performed by the CPU 610, and the contents of an address management table 112A, 512A or 122A, a monitoring address list 112B, 512B, 122B or 522B, etc.

The display unit 640 is not an indispensable component in the master node 110 or 510, and the slave node 120 or 520. The display unit 640 is required to display screens, such as the resource duplication designation screen 200, node setting screen 300, node status display/control screen 400, etc. described in the control node 130 or 530 with reference to each process unit of a process unit 131 or 531, usually is a display device, such as a CRT display, LCD, etc., and corresponds to the display unit 132 or 532 of the control node, 130 or 530, respectively, shown in FIGS. 1 and 13.

The inpuit unit 650 is a device used to input or designate through a screen displayed on the display unit 640, and usually comprises an input device, such as a keyboard, mouse, etc., a touch panel, a voice input device, etc. Like the display unit 640, this unit 650 is not an indispensable component in the master node 110 or 510, and the slave node 120 or 520. The unit 650 corresponds to the input unit 133 or 533 of the control node 130 or 530.

The printer unit 660 is a printer, such as a laser printer for printing data, etc. stored in the memory unit 620 or the storage unit 630 according to instructions from a user, etc. The printer unit 660 is not an indispensable component of the node representation system 100 or 500, and is an arbitrary component of the master node 110 or 510, slave node 120 or 520 and control node 130 and 530.

The network interface unit 670 is used to connect the master node 110 or 510, the slave node 120 or 520, the control node 130 or 530 and the nodes of other computers through the network 140 to communicate with each other. When this connection for communications is made through a public network or dedicated line, wired or wireless network communication equipment, such as a modem, a terminal adaptor, DSU (Digital Service Unit), router, etc. are needed. The interface unit 670 is such a communication interface device including these. The network 140 or 540 connecting the above nodes can have an arbitrary form, such as a ring, a star, a bus, combinations thereof, etc. The network can also have any arbitrary configuration and scale, and can be a LAN, a MAN, a WAN, the Internet, an intranet, an extranet, a satellite communication network, etc.

The bus 680 is a common transmission line for transmitting and receiving data, messages, instructions, etc. between the above described components 610 to 670.

As described earlier, in this preferred embodiment, when nodes to be monitored are determined in the first place, attention is paid to the order of data entry in an address management table 112A or 122A, and nodes with a real IP address stored in an entry next to an entry in which the virtual IP address of a monitored node is stored, is targeted. However, the present invention is implemented by a plurality of nodes configured in such a way that a first node may monitor a second node, such monitoring relations may be established in order to form a closed loop, and as a result the first node may also be monitored by another node. Therefore, the entry order in the table in not necessarily used to establish such a link relation among nodes like the above address management table 112A, and many other methods using not a table inside which information for defining the monitoring relation is stored, but other data structures, such as a list, can be easily considered. Since the present invention can logically define the order of nodes in a monitoring relation, a system can be easily modified, and therefore the present invention is excellent in the maintenance and extensibility of a system.

The node representation system of the present invention can control in such a way that out of a plurality of nodes on a network, one can be set as a master node and one or more as slave nodes in response to the stop of a node, due to the occurrence of a variety of events, such as the detection of a failure in a node, the generation of a schedule, the request of resource duplication, etc., another node can represent the functions provided by the stopped node. It can also control in such a way that another node can also monitor nodes monitored by the stopped node.

Adopting the present invention, in the operation of a plurality of nodes existing on a network, the monitoring and representation of each node can be implemented, for example, by controlling the virtual IP addresses of the nodes without classifying the nodes into either of a running system and a standby system, the functions and services provided by the nodes can be distributed at low cost, and the reliability of the system as a whole can be improved. Furthermore, in the operation, not only the status display, but also the control of the plurality of nodes, and therefore the maintainability, can be improved.

Although the invention has been described and illustrated with a certain degree of particularity, it is understood that the present disclosure has been made only by way of examples, and that numerous changes in the combination and arrangement of parts can be made therein by those skilled in the art without departing from the spirit and scope of the invention, as hereinafter claimed.

What is claimed is:

1. A node representation system for each node representing functions provided by another node in a system where a plurality of nodes are connected through a network, the node representation system comprising:

each of the nodes includes:
  an activation controlling unit obtaining information on monitoring when the node is activated;
  a monitoring/representing unit monitoring a normal operation of a first other node based on information obtained by the activation controlling unit, and when a failure is detected in the first other node, representing both the monitoring of a second other node monitored by the first other node, and the functions provided by the first other node; and
  a first address storing unit storing a real IP (internet protocol) address and a virtual IP address of each of said plurality of nodes,
  wherein the activation controlling unit and monitoring/ representing unit of each of the nodes are controlled in such a way that a first node may monitor a normal operation of a second node, the second node may monitor the normal operation of the first node or a third node, and after which such a relation is established in order to construct one closed-looped logical monitoring network.

2. The node representation system according to claim 1, wherein
  said monitoring/representing unit monitors a status of an individual function provided by said first other node, and represents the functions provided by said first node in units of individual functions, the stopping of whose provision is detected.

3. The node representation system according to claim 1, wherein said activation controlling unit obtains the real address and virtual address of the first other node to be monitored from said first address storing unit, and
  wherein said monitoring/representing unit monitors an operation of the first other node to be monitored using the real address of the first other node, and represents functions provided by the first other node using the virtual address of the first other node.

4. The node representation system according to claim 3, wherein
  said first address storing unit stores the real address and virtual address of each of said nodes in a predetermined node order.

5. The node representation system according to claim 3, wherein each of said nodes further comprises:
  a second address storing unit storing the real address and virtual address of each of said nodes,
  wherein said activation controlling unit duplicates a contents of said first address storing unit to said second address storing unit.

6. The node representation system according to claim 3, wherein said activation controlling unit includes:

a storing unit for storing the real address and virtual address of each node in one entry of said first address storing unit in said node order; and a searching unit searching said first address storing unit, when a storage entry of a real address next to an entry in which a real address of an own node is stored, is not a storage entry of a final real address, recognizing a node with a real address stored in the next storage entry of a real address as the first other node to be monitored, and when the storage entry of the next real address is the storage entry of a final real address, recognizing a node with a real address stored in a storage entry of a leading real address as the first other node to be monitored.

7. The node representation system according to claim 3, further comprising:

a node setting unit for storing information on the real address and virtual address of each of said nodes in said first address storing unit according to an instruction from a node connected to said network.

8. The node representation system according to claim 1, wherein said monitoring/representing unit includes:

a detecting unit detecting a restoration of a failure in the first other node both while a monitor of the second other node monitored by the first other node is monitored and functions provided by the first other node are represented; and a representation stopping unit stopping the representation of the functions provided by the first other node when the restoration of the failure in the first other node is detected by said detecting means.

9. The node representation system according to claim 1, wherein the failure in operation of the first other node to be detected by said monitoring/representing unit is a pause of an operation in said first node.

10. The node representation system according to claim 1, further comprising:

a schedule information storing unit storing schedule information on an operation of each node, wherein, said monitoring/representing unit monitors at least one node to be monitored by the first other node and represents at least one function to be performed by the first other node, based on the schedule information stored in the schedule information storing unit.

11. The node representation system according to claim 1, further comprising:

a displaying unit displaying a screen indicating by which node a status of each of said nodes and functions of each of said nodes are represented and performed.

12. The node representation system according to claim 1, further comprising:

a controlling unit modifying said status of each node as occasion demands.

13. The node representation system according to claim 1, further comprising:

a displaying unit displaying a screen indicating by which node a status of each of said nodes and functions of each of said nodes are represented and performed; and a controlling unit modifying the status of each of said nodes through the screen displayed by the displaying unit.

14. The node representation system according to claim 1, wherein the monitoring network is a closed-looped network where n sets of nodes are connected in a predetermined monitoring direction, and wherein when a failure occurs in i ($2 \leq i \leq n-2$) sets of nodes with a node immediately before an own node as an initial stage, the monitoring/representing unit of each node monitors operations of both the i sets of nodes and a node monitored by the last node of the i sets of the node group, and represents functions provided by each of the i sets of nodes.

15. The node representation system according to claim 1, wherein the monitoring network is a closed-looped network where n sets of nodes are connected in a predetermined monitoring direction, and wherein when a failure occurs in (n−1) sets of nodes with a node immediately before an own node as an initial stage, the monitoring/representing unit of each node monitors operations of the (n−1) sets of nodes, and represents functions provided by the (n−1) sets of nodes.

16. A node representation system for each node representing functions provided by another node in a system where a plurality of nodes are connected through a network, and out of said plurality of nodes, one is set as a master node and two or more as slave nodes, the node representation system comprising:

each of the master node and the slave nodes includes:

an activation controlling unit obtaining information on monitoring when its own node is activated; and a monitoring/representing unit monitoring a normal operation of a first other node based on the information obtained by the activation controlling unit, when a failure is detected in the normal operation of the first other node, monitoring a normal operation of a second other node monitored by the first other node and representing functions provided by the first other node, wherein the activation controlling unit and the monitoring/representing unit of each node control an own node in such a way that a first node may monitor the normal operation of a second node, the second node monitor may monitor a third node, and after which such a relation may be established in order and a closed-looped logical monitoring network may be constructed, said master node and said slave nodes, further including:

a resource duplicating unit duplicating a resource from said master node to said slave nodes and representing and performing functions provided by said slave nodes using the monitoring/representing unit of said master node while the resources are duplicated; and a first address storing unit for storing real IP (internet protocol) addresses and virtual IP addresses of each of said plurality of individual nodes.

17. The node representation system according to claim 16, wherein said monitor/representing unit monitors a status of each function provided by said first other node, and represents functions provided by said first other node in units of individual functions, the stopping of whose provision is detected, and said resource duplicating unit make the monitoring/representing unit of said master node represent and perform functions provided by said slave nodes in units of said individual functions.

18. The node representation system according to claim 16, wherein after said master node completes a resource duplication process of said two or more slave nodes, said resource duplicating unit makes the monitoring/representing means of said master node stop representing and performing at an appropriate timing functions of slave nodes of which said resource duplication process is completed.

19. The node representation system according to claim 16, wherein when said master node completes a resource duplication process for all of said slave nodes, said resource duplicating unit duplicates resources duplicated for said slave nodes to a running resource of said master node.

20. The node representation system according to claim 19, wherein while said resource duplicating unit is duplicating the resources duplicated for said slave nodes to its own running resource, said master node is both represented and performed functions provided by its own node by monitoring/representing means of a node monitored by its own node.

21. The node representation system according to claim 16, wherein while said master node is duplicating a resource from said master node to said slave nodes, said resource duplicating unit makes the monitoring/representing unit of said master node represent and perform a monitoring of other nodes monitored by said slave nodes.

22. The node representation system according to claim 16,
wherein a monitoring direction along a closed loop with the master node as a start point is set, and
wherein said resource duplicating unit performs a resource duplication from said master node to said slave nodes in said order of the monitoring direction.

23. The node representation system according to claim 16,
wherein said activation controlling unit of the master node and slave nodes obtains a real address and a virtual address of a first other node to be monitored from said first address storing unit,
said monitoring/representing unit of the master node and slave nodes monitors an operation of the first other node to be monitored using the real address of the first other node, and represents functions provided by said first other node using the virtual address of the first other node, and
while said resource duplicating unit are duplicating a resource from said master node to said slave nodes, said monitoring/representing unit of the master node represents and performs functions provided by said slave nodes using the virtual address of said slave nodes.

24. The node representation system according to claim 23, wherein a specific virtual address is assigned to said master node, and said specific virtual address is stored in said first address storing unit.

25. The node representation system according to claim 23, wherein said first address storing unit are provided in said master node.

26. The node representation system according to claim 25, wherein each of said slave nodes further comprises:
second address storing unit for storing a real address and a virtual address of each of said nodes, and
said activation controlling unit of each of the slave nodes duplicates a contents of the first address storing unit of the master node to said second address storing unit.

27. The node representation system according to claim 26, wherein
said first address storing unit stores a real address and a virtual address of each node in one entry in said order of nodes,
said activation controlling unit of the master node and said activation controlling unit of the slave nodes search said first and second address storing unit, respectively, if a storage entry of a real address next to an entry in which a real address of its own node is stored, is not a storage entry of a final real address, recognize a node with a real address stored in a storage entry of the next real address as a first other node to be monitored, and if the storage entry of the next real address is the storage entry of the final real address, recognize a node with a real address stored in a storage entry of a leading real address as the first other node to be monitored.

28. The node representation system according to claim 16, further comprising:
a resource duplication designating unit instructing execution of said resource duplicating unit from a control node connected to said network.

29. The node representation system according to claim 16, further comprising:
a schedule information storing unit for storing schedule information on an execution of said resource duplicating unit, wherein
said resource duplicating unit execute a process based on schedule information stored in the schedule information storing unit.

30. The node representation system according to claim 29, wherein said schedule information storing unit are provided in said master node.

31. The node representation system according to claim 29, further comprising:
a schedule designating unit storing said schedule information in said schedule information storing unit according to an instruction from said control node connected to said network.

32. The node representation system according to claim 31, wherein the instruction from said control node is reported to said master node.

33. The node representation system according to claim 32, wherein said schedule information storing unit is provided in said master node.

34. The node representation system according to claim 16, further comprising:
a node setting unit storing information related to the real address and virtual address of each of said nodes in said first address storing unit according to an instruction from a control node connected to said network.

35. The node representation system according to claim 34, wherein the instruction from said control node is reported to said master node.

36. The node representation system according to claim 35, said first address storing unit is provided in said master node.

37. The node representation system according to claim 16, further comprising:
a displaying unit displaying a screen indicating by which node a status of each of said nodes and functions of each of said nodes are represented.

38. The node representation system according to claim 16, further comprising:
a controlling unit modifying said status of each node as occasion demands.

39. The node representation system according to claim 16, further comprising:
a displaying unit displaying a screen indicating by which node a status of each of said nodes and functions of each of said nodes are represented; and
a controlling unit modifying said status of each node through a screen displayed by the displaying unit.

40. The node representation system according to claim 16,
wherein the network is a closed-looped logical monitoring network in which n sets of nodes are connected in a predetermined monitoring direction, and wherein said monitoring/representing unit of each of the nodes monitors the i sets of nodes and a node monitored by the last node of i sets of the node group, and represents functions provided by the i sets of nodes when a failure occurs 20 in i (2<i<n−2) sets of nodes with a node immediately before its own node as an initial stage.

41. The node representation system according to claim 16, wherein the network is a closed-looped logical monitoring network in which n sets of nodes are connected in a predetermined monitoring direction, and wherein said monitoring/representing unit of each of the nodes monitors an operation of the (n−1) sets of nodes, and represents functions provided by the (n−1) sets of nodes when a failure occurs in (n−1) sets of nodes with a node immediately before its own node as an initial stage.

42. A node monitoring system for each node monitoring a failure of another node in a system where a plurality of nodes are connected through a network, the node monitoring system comprising:

each node includes:
an activation controlling unit obtaining information on monitoring when being activated;
a monitoring unit monitoring a normal operation of a first other node based on information obtained by the activation controlling unit, and when a failure is detected in the normal operation of the first other node, representing a monitoring of a second node monitored by the first node;
a first address storing unit storing at least a real IP (internet protocol) address and a virtual IP address of each of the plurality of nodes,
wherein the activation controlling unit and the monitoring unit of each node control in such a way that a first node may monitor a normal operation of a second node, the second node may monitor a normal operation of the first node or a third node, after that such a monitoring relation may be established in order, and a closed-looped logical monitoring network may be constructed.

43. The node monitoring system according to claim 42, wherein said monitoring unit monitors a status of individual functions provided by said first other node, and represents a monitoring of said first other node in units of individual functions whose failure is detected.

44. The node monitoring system according to claim 42,
wherein said activation controlling unit obtains the real address and virtual address of the first other node from said first address storing unit, and
wherein said monitoring unit monitors an operation of the first other node using the real address of the first node, and represents functions provided by the first other node using the virtual address of the first other node.

45. The node monitoring system according to claim 44, wherein said first address storing unit stores said real address of each node in a predetermined order of nodes.

46. The node monitoring system according to claim 44, wherein each of said nodes further includes:
a second address storing unit storing at least said real address of each node, and
said activation controlling unit duplicates a contents of said first address storing unit to said second address storing unit.

47. The node monitoring system according to claim 46, wherein said activation controlling unit includes:
a storing unit for storing a real address of each node in one entry of said second address storing unit in a predetermined order of nodes, and a search said second address storing unit, if a storage entry of a real address next to an entry which a real address of its own node is stored, is not a storage entry of a final real address, recognizes a node with a real address stored in a storage entry of the next real address as a first other node to be monitored, and if the storage entry of the next real address is the storage entry of the final real address, recognizes a node with a real address stored in a storage entry of a leading real address as the first other node to be monitored.

48. The node monitoring system according to claim 44, further comprising:
a node setting unit storing information related to a real address of each of said nodes in said first address storing unit according to an instruction from a node connected to said network.

49. The node monitoring system according to claim 42, wherein said monitoring unit includes:
a detecting unit detecting a restoration of the first other node while representing a monitoring of a second other node monitored by the first other node; and
a representation stopping unit stopping the representation of functions provided by the first other node when a restoration of a failure in the first other node is detected.

50. The node monitoring system according to claim 42, wherein failures in an operation of the first other node detected by said monitoring unit also include a pause of an operation of the first other node.

51. The node monitoring system according to claim 42, further comprising:
a schedule information storing unit storing schedule information on an operation of each node, wherein
said monitoring unit represents and performs monitoring to be performed by the first other node based on schedule information stored in said schedule information storing unit.

52. The node monitoring system according to claim 42, further comprising:
a displaying unit displaying a screen indicating a status of each of said nodes.

53. The node monitoring system according to claim 42, further comprising:
a controlling unit modifying a status of each of said nodes as an occasion demands.

54. The node monitoring system according to claim 42, further comprising:
a displaying unit displaying a screen indicating a status of each of said nodes; and
a controlling unit modifying a status of each of said nodes through a screen displayed by said displaying unit.

55. The node monitoring system according to claim 42,
wherein the monitoring network is a closed-looped network in which n sets of nodes are connected in a predetermined monitoring direction, and
wherein said monitoring/representing unit of each of the nodes monitors the i sets of nodes and a node monitored by the last node of i sets of the node group, and represents functions provided by the i sets of nodes when a failure occurs in i (2<i<n−2) sets of nodes with a node immediately before its own node as an initial stage.

56. The node monitoring system according to claim 42,
wherein the monitoring network is a closed-looped network in which n sets of nodes are connected in a predetermined monitoring direction, and wherein said monitoring/representing unit of each of the nodes monitors an operation of the (n−1) sets of nodes, and represents functions provided by the (n−1) sets of nodes when a failure occurs in (n−1) sets of nodes with a node immediately before its own node as an initial stage.

57. A master node in a system where out of a plurality of nodes on a network, one is set as a master node and two or more as slave nodes, and the master node and the slave nodes provide one or more functions, the master node comprising:

a function representing unit instructing the slave nodes to stop the one or more functions provided by the slave nodes and representing the functions of the slave nodes;

a resource duplicating unit transmitting a latest resource for duplication to the slave nodes whose functions are represented using the function representing unit and duplicating the latest resource to the slave nodes;

a controlling unit restarting the functions of the slave nodes after a process of the resource duplicating unit is completed;

an address storing unit storing a real IP (internet protocol) address and a virtual IP address of each of the plurality of nodes.

58. A slave node in a system where out of a plurality of nodes on a network, one is set as a master node and two or more as slave nodes, and the master node and the slave nodes provide one or more functions, the slave node comprising:

a represented unit having its own functions represented by the master node according to an instruction from the master node;

a resource duplicating unit duplicating a latest resource received from the master node as a running resource while is having its own functions represented by the master node;

a function restarting unit restarting its own functions receiving a report that a representation of its own function is terminated by the master node after a resource duplication process is completed by the resource duplicating unit; and an address storing unit storing a real IP (internet protocol) address and a virtual IP address of each of the plurality of nodes.

59. A control node in a system where out of a plurality of nodes on a network, one is set as a master node and two or more as slave nodes, further out of the plurality of nodes one is set as a control node, and the master node and the slave nodes provide one or more functions, the control node comprising:

a displaying unit displaying an input screen of schedule data;

an inputting unit inputting the schedule data through the input screen displayed by the displaying unit; and a unit transmitting the schedule data inputted through the inputting unit to the master node, wherein the network is a closed-looped network in which n sets of nodes are connected in a predetermined monitoring direction, and wherein each node has a real IP (internet protocol) address and a virtual IP address.

60. A master node in a system where out of a plurality of nodes on a network, one is set as a master node and two or more as slave nodes, further out of the plurality of nodes one is set as a control node, and the master node and the slave nodes provide one or more functions, the master node comprising:

a receiving unit receiving schedule data from the control node;

a controlling unit controlling an operation of its own node and the slave nodes based on schedule data received by said receiving unit; and an address storing unit storing a real IP (internet protocol) address and a virtual IP address of each of the plurality of nodes.

61. A slave node in a system where out of a plurality of nodes on a network, one is set as a master node and two or more as slave nodes, and the master node and the slave nodes provide one or more functions, the slave node comprising:

a receiving unit receiving an instruction on a predetermined operation from the master node;

an operating unit performing an instructed operation received by said receiving unit; and an address storing unit storing a real IP (internet protocol) address and a virtual IP address of each of the plurality of nodes.

62. A control node in a system where out of a plurality of nodes on a network, one is set as a master node and two or more as slave nodes, further out of the plurality of nodes one is set as a control node, and the master node and the slave nodes provide one or more functions, the control node comprising:

a displaying unit displaying a list display screen of a running status of the master node or the slave nodes;

an inputting unit inputting control information for modifying the running status of the master node or slave nodes through the list display screen of the running status displayed by said displaying unit; and a unit transmitting the control information inputted through the inputting unit to the master node, wherein the network is a closed-looped network in which n sets of nodes are connected in a predetermined monitoring direction, and wherein each node has a real IP (internet protocol) address and a virtual IP address.

63. A control node in a system where out of a plurality of nodes on a network, one is set as a master node and two or more as slave nodes, further out of the plurality of nodes one is set as a control node, and the master node and the slave nodes provide one or more functions, the control node comprising:

an obtaining unit obtaining information related to a running status of the master node or the slave nodes from the master node; and a displaying unit displaying a list of the running status of the master node or the slave nodes based on the information on the running status obtained by said obtaining unit, wherein the network is a closed-looped network in which n sets of nodes are connected in a predetermined monitoring direction, and wherein each node has a real IP (internet protocol) address and virtual IP address.

64. A master node in a system where out of a plurality of nodes on a network, one is set as a master node and two or more as slave nodes, further out of the plurality of nodes one is set as a control node, and the master node and the slave nodes provide one or more functions, the master node comprising:

a collecting unit collecting running status information of at least one of the master node and one or more of the slave nodes;

a reporting unit reporting the running status information collected by said collecting unit; and an address storing unit storing a real IP (internet protocol) address and a virtual IP address of each of the plurality of nodes.

65. A slave node in a system where out of a plurality of nodes on a network, one is set as a master node and or more as slave nodes, and the master node and the slave nodes provide one or more functions, the slave node comprising:

a receiving unit receiving a report request on a running status from the master node;

a reporting unit reporting its own running status to the master node as a response when said receiving unit receives the report request; and an address storing unit storing a real IP (internet protocol) address and a virtual IP address of each of the plurality of nodes.

66. A master node in a system where out of a plurality of nodes on a network, one is set as a master node and two or more as slave nodes, further out of the plurality of nodes one is set as a control node, and the master node and the slave nodes provide one or more functions, the master node comprising:

a receiving unit receiving control information for modifying a running status of the master node or the slave nodes from the control node;

a controlling unit controlling an operation of its own node or the slave nodes based on the control information; and an address storing unit storing a real IP (internet protocol) address and a virtual IP address of each of the plurality of nodes.

67. A slave node in a system where out of a plurality of nodes on a network, one is set as a master node and two or more as slave nodes, and the master node and the slave nodes provide one or more functions, the slave node comprising:

a receiving unit receiving an instruction on a predetermined operation from the master node;

an operating unit performing the instructed operation received by said receiving unit; and an address storing unit storing a real IP (internet protocol) address and a virtual IP address of each of the plurality of nodes.

68. A control node in a system where out of a plurality of nodes on a network, one is set as a master node and two or more as slave nodes, further out of the plurality of nodes one is set as a control node, and the master node and the slave nodes provide one or more functions, the control node comprising:

an inputting unit inputting information related to each node; and a transmitting unit transmitting the information inputted by said inputting unit to the master node, wherein the network is a closed-looped network in which n sets of nodes are connected in a predetermined monitoring direction, and wherein each node has a real IP (internet protocol) address and a virtual IP address.

69. The control node according to claim 68, whe rein said information related to each node include at least one of a master class, an address on the network, an address of a node to be monitored, contents of monitor ing services and existence/non-existence of a representation operation.

70. A master node in a system where out of a plurality of nodes on a network, one is set as a master node and two or more as slave nodes, further out of the plurality of nodes one is set as a control node, and the master node and the slave nodes provide one or more functions, the master node comprising:

a receiving unit receiving information related to each node;

a storing unit storing the information received by said receiving unit; and an address storing unit storing a real IP (internet protocol) address and a virtual IP address of each of the plurality of nodes.

71. The master node according to claim 70, wherein said information related to each node include at least one of a master class, an address on the network, the real and virtual addresses of a node to be monitored, contents of monitoring services and existence/nonexistence of a representation operation.

72. A slave node in a system where out of a plurality of nodes on a network, one is set as a master node and two or more as slave nodes, and the master node and the slave nodes provide one or more functions, the slave node comprising:

a receiving unit receiving the information from said storing unit of the master node in which information related to said each node is stored, at a predetermined timing;

a storing unit storing the information received by said receiving unit; and an address storing unit storing a real IP (internet protocol) address and a virtual IP address of each of the plurality of nodes.

73. The slave node according to claim 72, wherein said information related to said each node include at least one of a master class, an address on the network, the real and virtual addresses of a node to be monitored, contents of monitoring services and existence/non existence of a representation operation.

74. A node representation method of a plurality of nodes on a network representing functions provided by other nodes, said method comprising:

controlling an activation of each node in such a way that a first node may monitor a normal operation of a second node, the second node may monitor a normal operation of the first node or a third node, after which such a monitoring relation may be established in order, a logical monitoring network in one closed loop form may be constructed, and as a result, the first node may also be monitored by a node other than the first node;

detecting at each of said nodes a failure in a node to be monitored, representing functions provided by the node to be monitored and monitoring of another node monitored by the node to be monitored at a node having detected the failure; and storing a real IP (internet protocol) address and a virtual IP address of each of the plurality of nodes.

75. A node representation method of a plurality of nodes on a network representing functions provided by other nodes, said method comprising:

controlling an activation of each node in such away that.a first node may monitor a normal operation of a second node, the second node may monitor a normal operation of the first node or a third node, after which such a monitoring relation may be established in order, a logical monitoring network in one closed loop form may be constructed, and as a result, the first node may also be monitored by a node other than the first node;

setting out of the plurality of nodes, one as a master node and one or more as slave nodes, duplicating a resource from the master node to at least one of slave nodes, and making the master node represent functions provided by the slave nodes during the resource duplication; and storing a real IP (internet protocol) address and a virtual IP address of each of the plurality of nodes.

76. A node representation method of a plurality of nodes on a network representing functions provided by other nodes, said method comprising:

controlling an activation of each node in such a way that a first node may monitor a normal operation of a second node, the second node may monitor a normal operation of the first node or a third node, after which such a monitoring relation may be established in order, a logical monitoring network in one closed loop form may be constructed, and as a result, the first node may also be monitored by a node other than the first node;

detecting at each of said nodes a failure in a node to be monitored and representing monitoring of another node monitored by the node to be monitored at a node having detected the failure; and storing a real IP (internet protocol) address and a virtual IP address of each of the plurality of nodes.

77. A computer readable storage medium for storing a program to enable a computer to implement a node representation method of a plurality of nodes on a network representing functions provided by other nodes, the program comprising:

controlling an activation of each node in such a way that a first node may monitor a normal operation of a second node, the second node may monitor a normal operation of the first node or a third node, after which such a monitoring relation may be established in order, a logical monitoring network in one closed loop form may be constructed, and as a result, the first node may also be monitored by a node other than the first node;

detecting at each of said nodes a failure in a node to be monitored, representing functions provided by the node to be monitored and monitoring of another node monitored by the node to be monitored at a node having detected the failure; and storing a real IP (internet protocol) address and a virtual IP address of each of the plurality of nodes.

78. A computer readable storage medium for storing a program to enable a computer to implement a node representation method of a plurality of nodes on a network representing functions provided by other nodes, the program comprising:

controlling an activation of each node in such a way that a first node may monitor a normal operation of a second node, the second node may monitor a normal operation of the first node or a third node, after which such a monitoring relation may be established in order, a logical monitoring network in one closed loop form may be constructed, and as a result, the first node may also be monitored by a node other than the first node;

setting out of the plurality of nodes, one as a master node and one or more as slave nodes, duplicating a resource from the master node to at least one of the slave nodes, and making the master node represent functions provided by the slave nodes during the resource duplication; and storing a real IP (internet protocol) address and a virtual IP address of each of the plurality of nodes.

79. A computer readable storage medium for storing a recorded program to enable a computer to implement a node representation method of a plurality of nodes on a network representing functions provided by other nodes, the program comprising:

controlling an activation of each node in such a way that a first node may monitor a normal operation of a second node, the second node may monitor a normal operation of the first node or a third node, after which such a monitoring relation may be established in order, a logical monitoring network in one closed loop form may be constructed, and as a result, the first node may also be monitored by a node other than the first node;

detecting at each of said nodes a failure in a node to be monitored and, representing monitoring of another node monitored by the node to be monitored at a node having detected the failure; and storing a real IP (internet protocol) address and a virtual IP address of each of the plurality of nodes.

80. A node representation method of a plurality of nodes on a network representing functions provided by other nodes, comprising:

establishing a logical monitoring network comprising n sets of nodes, wherein a first node may monitor a normal operation of a second node, and the second node may monitor a normal operation of the first node or a third node;

storing a real IP (internet protocol) address and a virtual IP address of each of the plurality of nodes;

detecting a failure in a node to be monitored; and monitoring another node, which is monitored by the node to be monitored, at a node that detected the failure.

81. A node representation system for each node representing a function provided by another node in a system where a plurality of nodes are connected through a network, the node representation system comprising:

an address management table for storing pairs of a real address and a virtual address of the plurality of nodes successively in a predetermined node order, wherein each of the plurality of nodes comprises:
an activation controlling unit to obtain a pair of a real IP (internet protocol) address and a virtual IP address succeeded to the node's address in the address management table when the node is activated; and
a monitoring/representing unit to monitor a normal operation of a first other node whose address is obtained by the activation controlling unit, and when a failure is detected in the first other node, to represent both the monitoring of a second other node that is monitored by the first other node and the functions provided by the first other node.

* * * * *

UNITED STATES PATENT AND TRADEMARK OFFICE
CERTIFICATE OF CORRECTION

PATENT NO.    : 6,633,538 B1 Page 1 of 1
DATED         : October 14, 2003
INVENTOR(S)   : Ryoju Tanaka et al.

It is certified that error appears in the above-identified patent and that said Letters Patent is hereby corrected as shown below:

<u>Column 29,</u>
Line 57, change "whe rein" to -- wherein --.
Line 60, change "monitor ing" to -- monitoring --.

<u>Column 30,</u>
Line 33, change "existence/non existence" to -- existence/non-existence --.

Signed and Sealed this

Third Day of February, 2004

JON W. DUDAS
*Acting Director of the United States Patent and Trademark Office*